United States Patent
Hwang et al.

(10) Patent No.: US 11,510,077 B2
(45) Date of Patent: Nov. 22, 2022

(54) METHOD AND USER EQUIPMENT FOR PERFORMING MEASUREMENT BY USING MULTIPLE RECEPTION BEAMS

(71) Applicant: LG Electronics Inc., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 216 days.

(21) Appl. No.: 16/753,977

(22) PCT Filed: Nov. 29, 2018

(86) PCT No.: PCT/KR2018/014948
§ 371 (c)(1),
(2) Date: Apr. 6, 2020

(87) PCT Pub. No.: WO2019/139254
PCT Pub. Date: Jul. 18, 2019

(65) Prior Publication Data
US 2020/0396627 A1    Dec. 17, 2020

Related U.S. Application Data

(60) Provisional application No. 62/616,435, filed on Jan. 12, 2018.

(51) Int. Cl.
*H04L 12/28* (2006.01)
*H04W 24/08* (2009.01)
*H04W 72/04* (2009.01)

(52) U.S. Cl.
CPC ......... *H04W 24/08* (2013.01); *H04W 72/046* (2013.01)

(58) Field of Classification Search
CPC ... H04W 24/08; H04W 72/046; H04W 24/10; H04W 8/24; H04W 16/28; H04W 72/00
(Continued)

(56) References Cited

U.S. PATENT DOCUMENTS

2013/0064129 A1    3/2013  Koivisto et al.
2016/0323022 A1*  11/2016  Rahman .............. H04B 7/0478
(Continued)

FOREIGN PATENT DOCUMENTS

KR    1020160018074        2/2016
WO    2017196612          11/2017
WO    WO-2019047191 A1 *   3/2019  ........... H04B 17/327

OTHER PUBLICATIONS

Samsung, "On Beam Management Measurement and Reporting," R1-1720290, 3GPP TSG RAN WG1 Meeting 91, Reno, USA, Nov. 17, 2017, see sections 2-3, 4.
(Continued)

*Primary Examiner* — Thai D Hoang
(74) *Attorney, Agent, or Firm* — Dentons US LLP

(57) ABSTRACT

The present specification discloses a method for performing measurement by a user equipment (UE). The method may include determining a first beam class from among a plurality of beam classes based on a number of receiving beams supported by the UE, transmitting UE capability information including information about the first beam class to a serving cell, and performing measurement on a downlink signal based on measurement requirement related to the first beam class.

14 Claims, 17 Drawing Sheets

(58) Field of Classification Search
USPC .................................. 370/329–330, 335–345
See application file for complete search history.

(56) References Cited

U.S. PATENT DOCUMENTS

| | | | |
|---|---|---|---|
| 2017/0208524 A1* | 7/2017 | Fukui | H04W 56/001 |
| 2020/0014474 A1* | 1/2020 | Khirallah | H04W 24/10 |
| 2020/0322030 A1* | 10/2020 | Yuan | H04W 72/0413 |
| 2021/0111928 A1* | 4/2021 | Zhang | H04L 25/0204 |
| 2021/0306041 A1* | 9/2021 | Gao | H04B 7/0478 |

OTHER PUBLICATIONS

Spreadtrum Communcations, "Remaining issues on beam reporting," R1-1719690, 3GPP TSG RAN WG1 Meeting 91, Reno, USA, Nov. 17, 2017, see sections 1-2, 5.

* cited by examiner

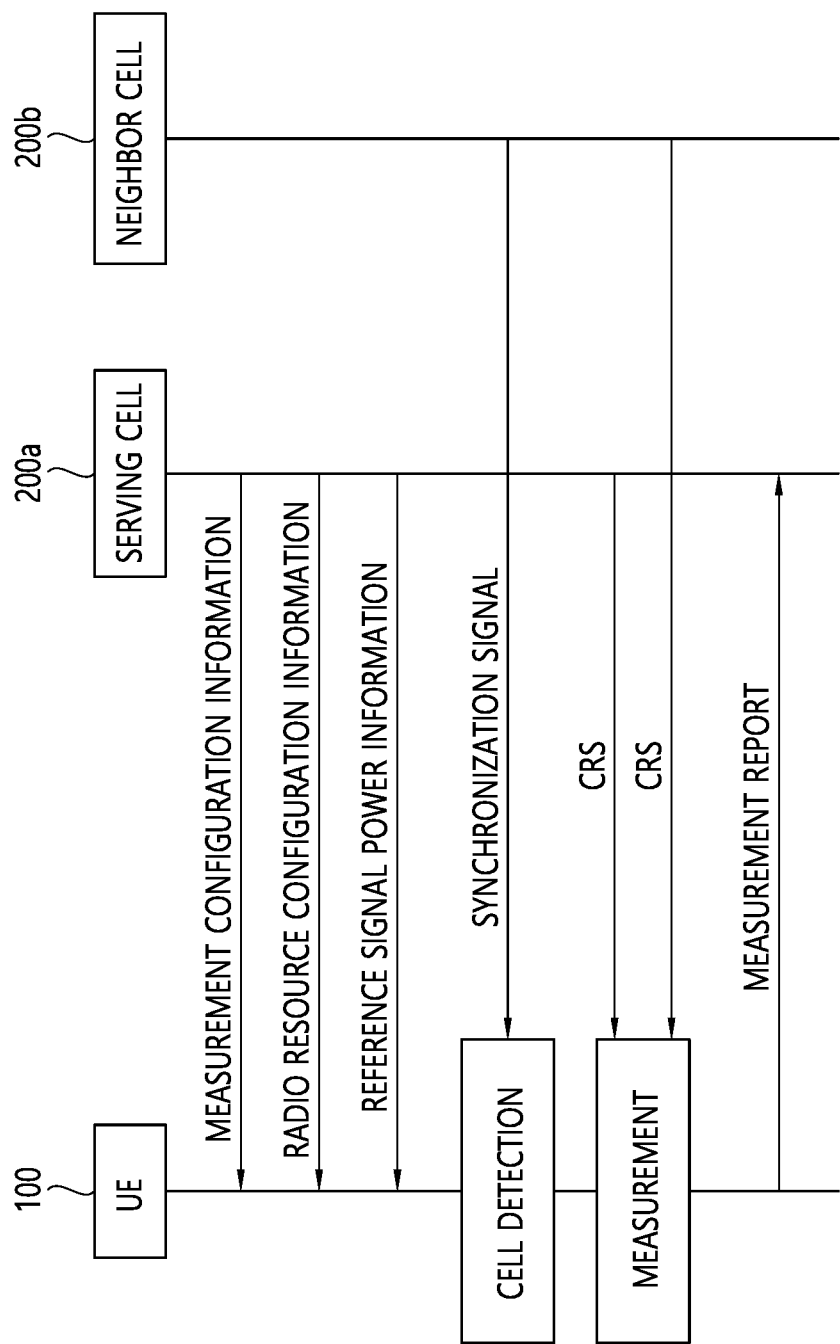

METHOD AND USER EQUIPMENT FOR PERFORMING MEASUREMENT BY USING MULTIPLE RECEPTION BEAMS

This application is the National Stage filing under 35 U.S.C. 371 of International Application No. PCT/KR2018/014948, filed on Nov. 29, 2018, which claims the benefit of U.S. Provisional Application No. 62/616,435 filed on Jan. 12, 2018, the contents of which are all hereby incorporated by reference herein in their entirety.

TECHNICAL FIELD

The present disclosure generally relates to next generation mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

An operating band in NR is divided into frequency range 1 (FR1) band and 1-R2 band. FR1 band means a frequency band of 6 GHz or less and FR2 band means a frequency band exceeding 6 GHz.

A user equipment (UE) operating in FR1 band, that is, 1-R1 UE, performs uplink signal transmission and downlink signal reception using an omnidirectional beam as in LTE.

A UE operating in FR2, that is, FR2 UE (mmWave NR UE), can improve transmission and reception performance by performing uplink signal transmission and downlink signal reception using a plurality of beams.

The number of beams used by a UE is not limited in NR related standards and may vary according to UE implementation. For example, UEs using different numbers of beams may be manufactured by UE manufacturers or different models of UEs using different numbers of beams may be manufactured by one UE manufacturer. Further, one UE may use different numbers of beams for measurement and downlink data reception.

When a UE operates in FR2, the number of transmitting beams or receiving beams used by the UE may affect measurement requirements with respect to radio resource management (RRM) such as radio link monitoring (RLM), a cell identification time and a measurement period. Furthermore, the number of transmitting beams or receiving beams used by the UE may also affect conformance test of the UE.

However, there are no conventional methods for defining measurement requirements with respect to RRM in consideration of the number of receiving beams used by a UE.

Moreover, when a UE performs measurement using a plurality of receiving beams, a measurement time varies according to the number of receiving beams used by the UE. Here, a base station needs to ascertain information representing that the UE measurement time may vary. However, there are no conventional methods by which a base station can ascertain information about the number of receiving beams used by a UE.

SUMMARY

Accordingly, a disclosure of the present specification has been made in an effort to solve the aforementioned problem.

That is, an object of the disclosure is to provide a method for defining measurement requirements with respect to RRM in consideration of the number of receiving beams used by a UE in a next generation mobile communication system.

In addition, an object of the disclosure is to provide a method for transmitting information about the number or receiving beams used by a UE to a base station in a next generation mobile communication system.

To accomplish the objects, one disclosure of the present specification provides a method for performing measurement by a user equipment (UE). The method may include: determining a first beam class from among a plurality of beam classes based on a number of receiving beams supported by the UE; transmitting UE capability information including information about the first beam class to a serving cell; and performing measurement on a downlink signal based on measurement requirement related to the first beam class.

The method may further include receiving downlink data based on the number of receiving beams supported by the UE.

The determining of the first beam class may include determining the first beam class from among the plurality of beam classes based on a number of receiving beams used for measurement and determining a second beam class from among the plurality of beam classes based on a number of receiving beams used for downlink data reception when different numbers of receiving beams are used for measurement and downlink data reception.

The UE capability information may include information about the first beam class and information about the second beam class.

The method may further include receiving the downlink data based on the number of receiving beams used for downlink data reception.

The method may further include changing the number of receiving beams when change in mobility of the UE is detected after the UE capability information is transmitted to the serving cell.

The method may further include: determining the first beam class from among the plurality of beam classes based on the changed number of receiving beams; and transmitting UE capability information including information about the first beam class determined based on the changed number of receiving beams to the serving cell.

The method may further include reducing the number of receiving beams when the UE operates in a power saving mode after the UE capability information is transmitted to the serving cell.

The method may further include: determining the first beam class from among the plurality of beam classes based on the reduced number of receiving beams; and transmitting UE capability information including information about the first beam class determined based on the reduced number of receiving beams to the serving cell.

The performing the measurement may further include selecting the measurement requirements related to the first beam class from a plurality of measurement requirement related to each of the plurality of beam classes.

The plurality of measurement requirements related to each of the plurality of beam classes may include at least one of a measurement period for synchronization signal/physical broadcast channel block (SS/PBCH block: SSB) based measurement related to each of the plurality of beam classes, a time period for PSS/SSS detection related to each of the plurality of beam classes, and a radio link monitoring (RLM) evaluation period related to each of the plurality of beam classes.

The measurement period, the time period and the evaluation period may have different values according to the plurality of beam classes.

To accomplish the objects, one disclosure of the present specification provides a user equipment (UE) performing measurement. The UE may include a transceiver and a processor configured to control the transceiver, wherein the processor may be configured to: determine a first beam class from among a plurality of beam classes based on a number of receiving beams supported by the UE; transmit UE capability information including information about the first beam class to a serving cell; and perform measurement on a downlink signal based on measurement requirement related to the first beam class.

According to one disclosure of the present specification, the above-described problems of conventional technologies are solved.

BRIEF DESCRIPTION OF THE DRAWINGS

FIG. 3 illustrates a procedure for cell detection and measurement.

Figure 1:
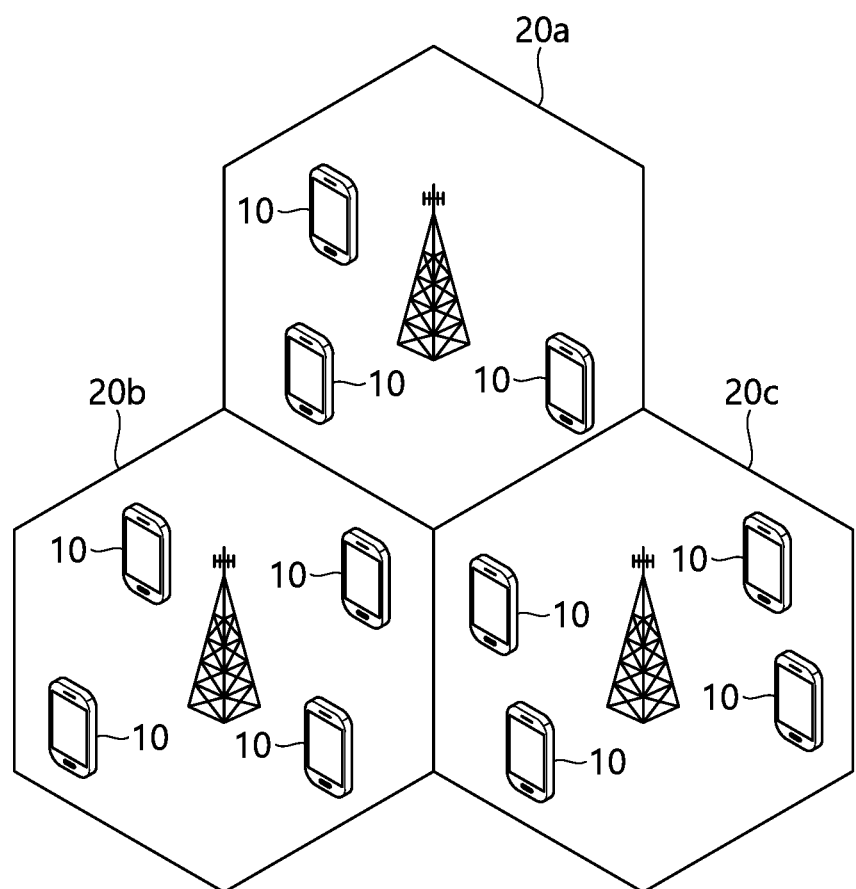
FIG. 1 is a wireless communication system.

DESCRIPTION OF EXEMPLARY
EMBODIMENTS

Hereinafter, based on 3rd Generation Partnership Project (3GPP) long term evolution (LTE) or 3GPP LTE-advanced (LTE-A), the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
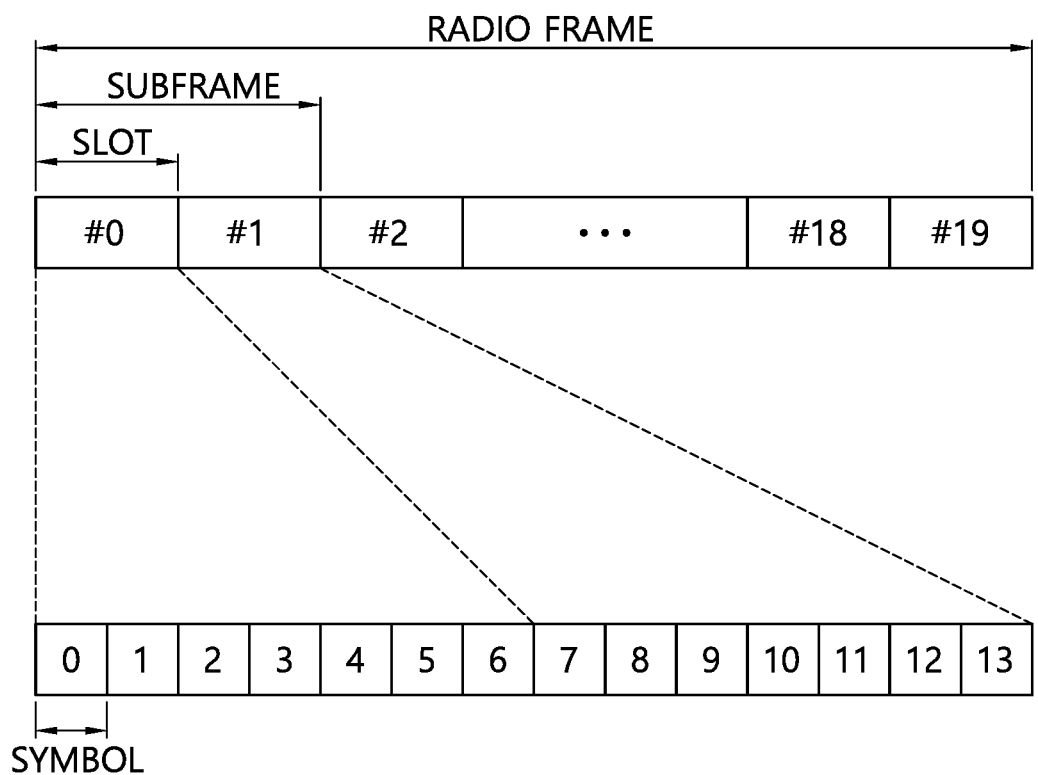
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Measurement and Measurement Report>

Supporting mobility of a UE 100 is essential in a mobile communication system. Thus, the UE 100 constantly measures a quality of a serving cell which is currently providing a service, and a quality of a neighbor cell. The UE 10 reports a result of the measurement to a network at an appropriate time, and the network provides optimal mobility to the UE through a handover or the like. Measurement for this purpose is referred to as a Radio Resource Management (RRM).

Meanwhile, the UE 100 monitors a downlink quality of a primary cell (Pcell) based on a CRS. This is so called Radio Link Monitoring (RLM).

FIG. 3 shows a procedure for cell detection and measurement.

Referring to FIG. 3, a UE detects a neighbor cell based on Synchronization Signal (SS) which is transmitted from the neighbor cell. The SS may include a Primary Synchronization Signal (PSS) and a Secondary Synchronization Signal (SSS).

When the serving cell 200a and the neighbor cell respectively transmit Cell-specific Reference Signals (CRSs), the UE 100 measures the CRSs and transmits a result of the measurement to the serving cell 200a. In this case, the UE 100 may compare power of the received CRSs based on received information on a reference signal power.

At this point, the UE 100 may perform the measurement in the following three ways.

1) RSRP(reference signal received power): This represents an average reception power of all REs that carry the CRS which is transmitted through the whole bands. In this case, instead of the CRS, an average reception power of all REs that carry the CSI RS may also be measured.

2) RSS (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a sub-band. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a radio resource configuration information element (IE) from the serving cell 100a for the measurement. The radio resource configuration information element (IE) is used to configure/modify/cancel a radio bearer or to modify an MAC configuration. The radio resource configuration IE includes subframe pattern information. The subframe pattern information is information on a measurement resource restriction pattern on the time domain, for measuring RSRP and RSRQ of a serving cell (e.g., PCell).

Meanwhile, the UE 100 receives a measurement configuration information element (IE) from the serving cell 100a for the measurement. A message including the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. A message including the measurement result is called a measurement report message.

The measurement configuration IE may include measurement object information. The measurement object information is information of an object which is to be measured by the UE. The measurement object includes at least one of an intra-frequency measurement object which is an object of intra-cell measurement, an inter-frequency measurement object which is an object of inter-cell measurement and an inter-RAT measurement object which is an object of inter-RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

TABLE 1

Measurement object field description carrierFreq
This indicates an E-UTRA carrier frequency to which this configuration is applied.
measCycleSCell
This indicates a cycle for measurement of a secondary cell (SCell) in a non-activated state. Its value may be set to 40, 160, 256, etc. If the value is 160, it indicates that measurement is performed every 160 subframes.

Meanwhile, the measurement configuration IE includes an information element (IE) as shown in the following table.

TABLE 2

MeasConfig field description allowInterruptions
If its value is True, it indicates that interruption of transmission and reception with a serving cell is allowed when measurement of subcarriers of an Scell in a non-active state is performed using MeasCycleScell.
measGapConfig
It indicates configuration or cancelation of a measurement gap.

The "measGapConfig" is used to configure or cancel a measurement gap (MG). The MG is a period for cell identification and RSRP measurement on an inter frequency different from that of a serving cell.

TABLE 3

MeasGapConfig field description gapOffset
Any one of gp0 and gp1 may be set as a value of gapOffset. gp0 corresponds to a gapoffset of pattern ID "0" having MGRP = 40 ms. gp1 corresponds to a gapoffset of pattern ID "1" having MGRP = 80 ms.

TABLE 4

| Gap pattern Id | Measurement Gap Length (MGL) | Measurement Gap Repetition Period (MGRP) | Minimum available time for inter-frequency and inter-RAT measurements during 480 ms period |
|---|---|---|---|
| 0 | 6 ms | 40 ms | 60 ms |
| 1 | 6 ms | 80 ms | 30 s |

When the UE requires a measurement gap to identify and measure a cell at an inter-frequency and inter-RAT, the E-UTRAN (i.e., the base station) may provide a single measurement gap (MG) pattern with a predetermined gap period to the UE. Without transmitting or receiving any data from the serving cell for the measurement gap period, the UE returns its RF chain to be adapted to the inter-frequency and then performs measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Internet of Things (IoT) Communication>

Hereinafter, IoT will be described.

The IoT communication refers to the exchange of information between an IoT devices without human interaction through a base station or between the IoT device and a server through the base station. In this way, the IoT communication is also referred to as CIoT (Cellular Internet of Things) in that the IoT communication is performed through the cellular base station.

This IoT communication is a kind of machine type communication (MTC). Therefore, the IoT device may be referred to as an MTC device.

The IoT communication has a small amount of transmitted data. Further, uplink or downlink data transmission/reception rarely occurs. Accordingly, it is desirable to lower a price of the IoT device and reduce battery consumption in accordance with the low data rate. In addition, since the IoT device has low mobility, the IoT device has substantially the unchanged channel environment.

In one approach to a low cost of the IoT device, the IoT device may use, for example, a sub-band of approximately 1.4 MHz regardless of a system bandwidth of the cell.

The IoT communication operating on such a reduced bandwidth may be called NB (Narrow Band) IoT communication or NB CIoT communication.

<Next-Generation Mobile Communication Network>

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

Figure 4A:
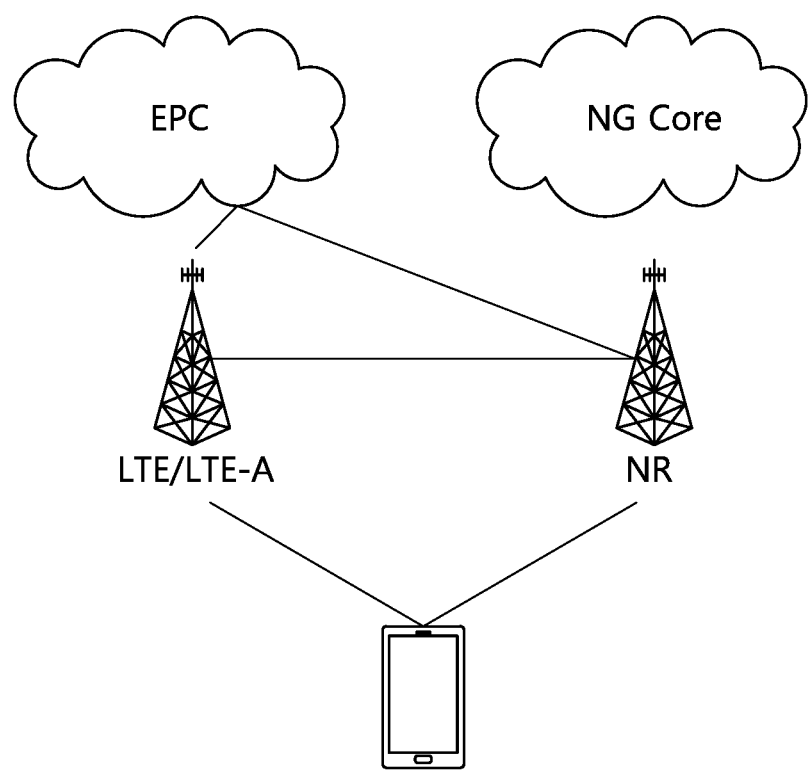
FIGS. 4A to 4C are diagrams illustrating exemplary architecture for a service of the next-generation mobile communication.
Figure 4B:
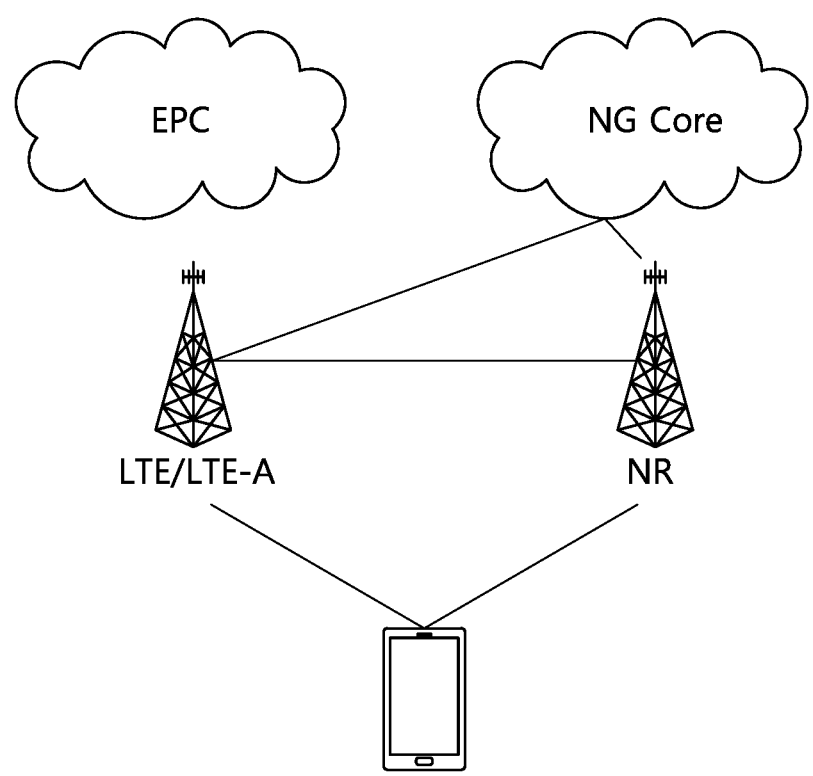
Figure 4C:
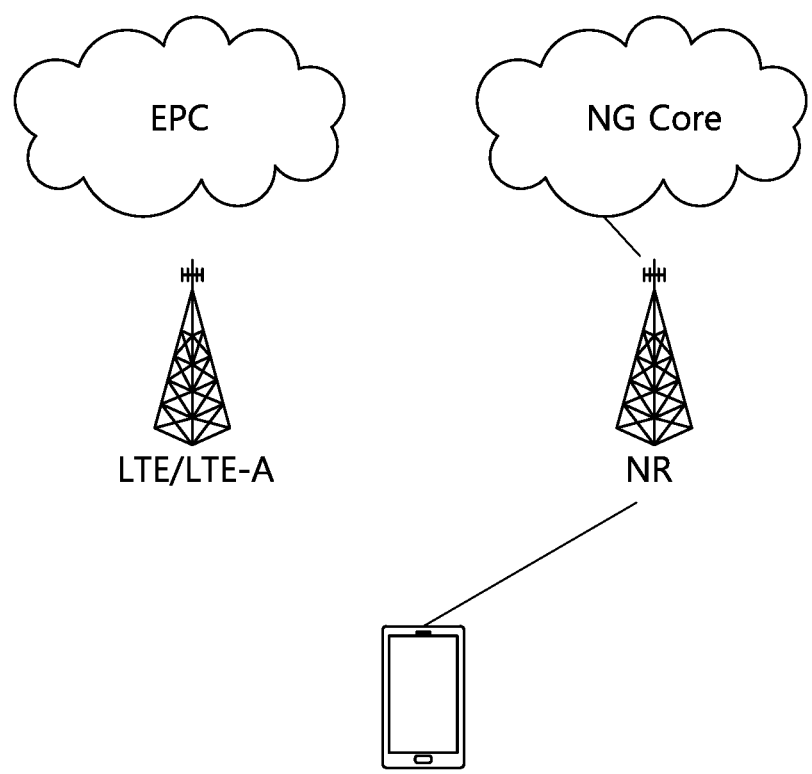

FIGS. 4A to 4C are diagrams illustrating exemplary architecture for a next-generation mobile communication service.

Referring to FIG. 4A, a UE is connected in dual connectivity (DC) with an LTE/LTE-A cell and a NR cell.

The NR cell is connected with a core network for the legacy fourth-generation mobile communication, that is, an Evolved Packet core (EPC).

Referring to FIG. 4B, the LTE/LTE-A cell is connected with a core network for 5th generation mobile communication, that is, a Next Generation (NG) core network, unlike the example in FIG. 4A.

A service based on the architecture shown in FIGS. 4A and 4B is referred to as a non-standalone (NSA) service.

Referring to FIG. 4, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

Figure 5:
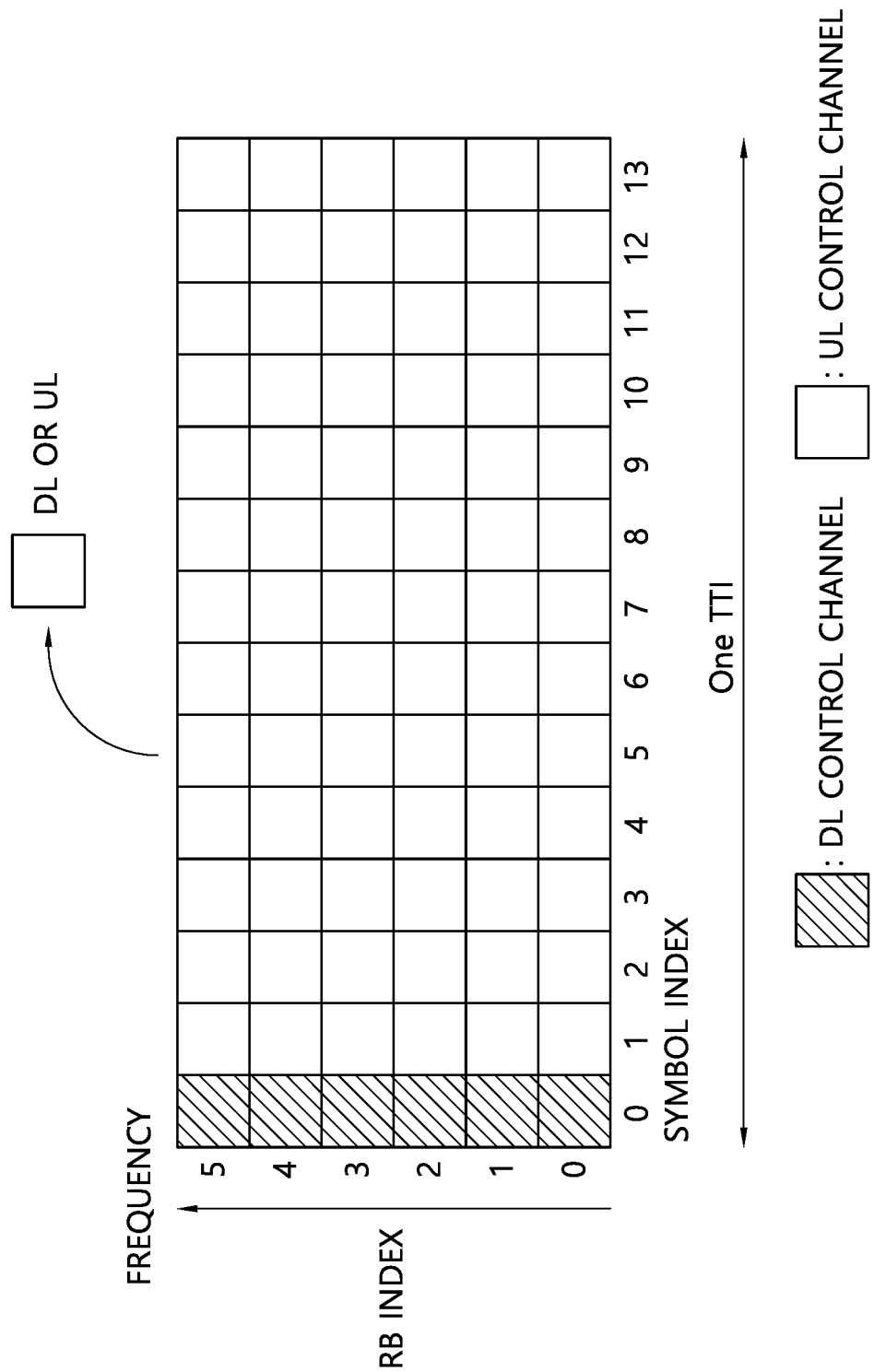
FIG. 5 illustrates an example of a subframe type in NR.

FIG. 5 Shows an Example of Subframe Type in NR.

A transmission time interval (TTI) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

TABLE 5

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by μ, the number of OFDM symbols per slot Nslotsymb, the number of slots per frame Nframe,μslot, and the number of slots per subframe Nsubframe,μslot are expressed as shown in the following table.

TABLE 6

| μ | Nslotsymb | Nframe, μslot | Nsubframe, μslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OFDM symbols per slot Nslotsymb, the number of slots per frame Nframe,μslot, and the number of slots per subframe Nsubframe,μslot are expressed as shown in the following table.

TABLE 7

| M | Nslotsymb | Nframe, μslot | Nsubframe, μslot |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 8

| Format | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | X | X | X | X | X | X | U | U | U |
| 45 | D | D | D | D | D | D | X | X | U | U | U | U | U | U |
| 46 | D | D | D | D | D | X | D | D | D | D | D | D | D | X |
| 47 | D | D | D | D | X | D | D | D | D | D | D | D | X | X |
| 48 | D | X | X | X | X | X | D | X | X | X | X | X | X | X |
| 49 | D | X | X | X | X | X | D | X | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | X | U | D | D | D | D | X | U | U | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | X | X | U |
| 61 | D | D | X | X | X | U | D | D | X | X | X | X | X | U |

<Operating Band in NR>

An operating band in NR is divided into frequency range 1 (FR1) band and 1-R2 band. FR1 band means a frequency band of 6 GHz or less and FR2 band means a frequency band exceeding 6 GHz. FR1 band and FR2 band are defined as shown in the following table 9.

TABLE 9

| Frequency band designation | Corresponding frequency range |
|---|---|
| Frequency Range 1 (FR 1) | 450 MHz-6000 MHz |
| Frequency Range 2 (FR 2) | 24250 MHz-52600 MHz |

Operating bands in the following table 10 are operating bands refarming from operating bands of LTE/LTE-A and correspond to FR1 band.

TABLE 10

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The following table 11 shows NR operating bands defined at high frequencies which correspond to 1-R2 band.

TABLE 11

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

Meanwhile, when the operating band shown in the above table is used, a channel bandwidth is used as shown in the following table.

TABLE 12

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table 12, SCS indicates a subcarrier spacing. In the above table, NRB indicates the number of RBs.

Meanwhile, when the operating band shown in the above table is used, a channel bandwidth is used as shown in the following table.

TABLE 13

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block. In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 6:
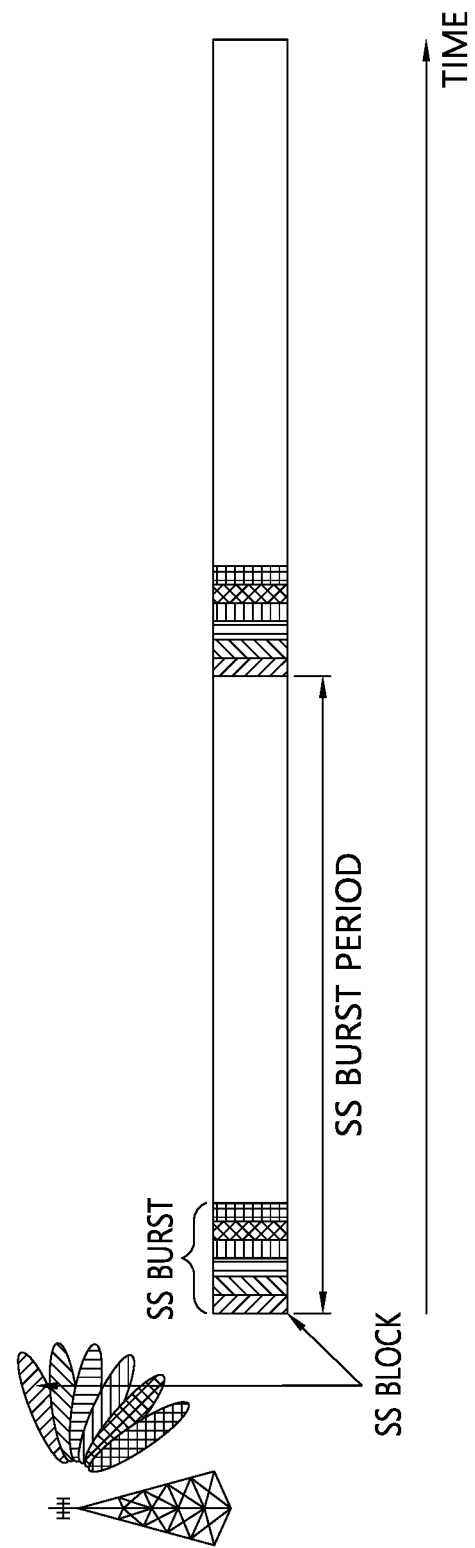
FIG. 6 illustrates an example of an SS block in NR.

FIG. 6 is a diagram illustrating an example of an SS block in NR.

Referring to FIG. 6, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 7.

Figure 7:
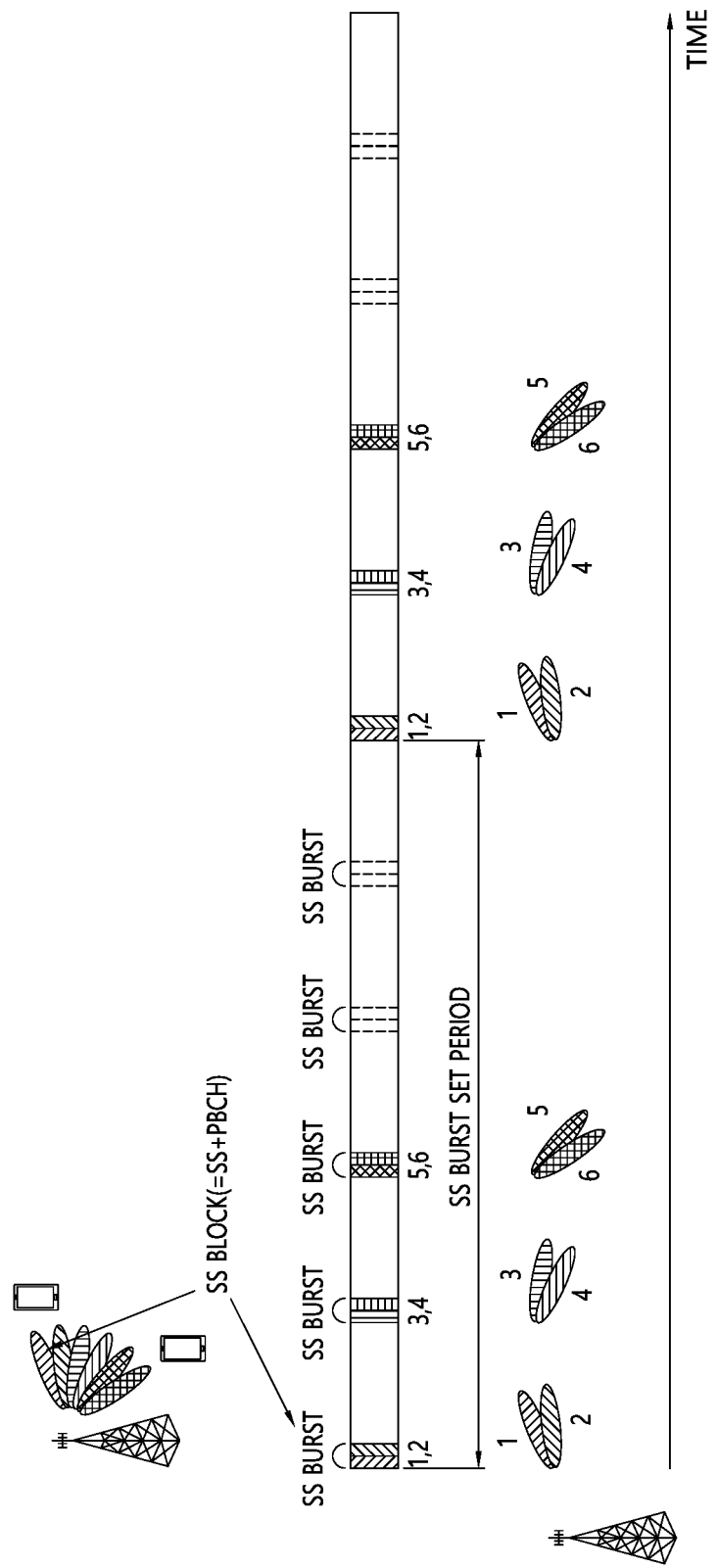
FIG. 7 illustrates an example of beam sweeping in NR.

FIG. 7 is a diagram illustrating an example of beam sweeping in the NR.

A base station transmits each SS block in an SS burst over time while performing beam sweeping. In this case, multiple SS blocks in an SS burst set are transmitted to support UEs existing in different directions. In FIG. 6, the SS burst set includes one to six SS blocks, and each SS burst includes two SS blocks.

<Channel Raster and Sync Raster>

Hereinafter, a channel raster and a sync rater will be described.

A frequency channel raster is defined as a set of RF reference frequencies (FREF). An RF reference frequency may be used as a signal indicative of locations of an RF channel, an SS block, and the like.

A global frequency raster may be defined with respect to all frequencies from 0 GHz to 100 GHz. The granularity of the global frequency raster may be expressed by ΔFGlobal.

An RF reference frequency is designated by NR Absolute Radio Frequency Channel Number (NR-AFRCN) in the global frequency raster's range (0 . . . 2016666). A relationship between the NR-AFRCN and the RF reference frequency (FREF) of MHz may be expressed as shown in the following equation.

$$F_{REF}=F_{REF\text{-}Offs}+\Delta F_{Global}(N_{REF}-N_{REF\text{-}Offs})$$  [Equation 1]

In Equation 1, $F_{REF\text{-}Offs}$ and $N_{Ref\text{-}Offs}$ are as shown in the following table.

TABLE 14

| Frequency Range (MHz) | $\Delta F_{Global}$ (kHz) | $F_{REF\text{-}Offs}$ (MHz) | $N_{REF\text{-}Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

A channel raster indicates a subset of FR reference frequencies able to be used to identify location of an RF channel in uplink and downlink. An RF reference frequency for an RF channel may be mapped to a resource element on a subcarrier.

Mapping of the RF reference frequency of the channel raster and the corresponding resource element may be used to identify a location of an RF channel. The mapping may differ according to a total number of RBs allocated to the channel, and the mapping applies to both uplink (UL) and downlink (DL).

When NRB mod 2=0, the RE index k is 0, and the number of PRBs is as below.

$$n_{PRB} = \left\lfloor \frac{N_{RB}}{2} \right\rfloor$$

When NRB mod 2=0, the RE index k is 6, the number of PRBs is as below.

$$n_{PRB} = \left\lfloor \frac{N_{RB}}{2} \right\rfloor$$

Locations of RF channels of a channel raster in each NR operating band may be expressed as shown in the following table.

TABLE 15

| NR Operating Band | $\Delta F_{Raster}$ (kHz) | Uplink Frequency Range of $N_{REF}$ (First-<Step size>-Last) | Uplink Frequency Range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
|  | 30 | 499200-<6>-537996 | 499200-<6>-537996 |
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
|  | 30 | 620000-<2>-680000 | 620000-<2>-680000 |
| n78 | 15 | 620000-<1>-653333 | 620000-<1>-653333 |
|  | 30 | 620000-<2>-653332 | 620000-<2>-653332 |
| n79 | 15 | 693334-<1>-733333 | 693334-<1>-733333 |
|  | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 16

| NR Operating Band | $\Delta F_{Raster}$ (kHz) | Uplink and Downlink Frequency Range (First-<Step size>-Last) |
|---|---|---|
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2087497 |

Meanwhile, a sync raster indicates a frequency location of an SS block used by a UE to acquire system information. The frequency location of the SS block may be defined as SSREF using a GSCN number corresponding thereto.

<Disclosure of Present Specification>

Hereinafter, a method of defining measurement requirements with respect to RRM in consideration of the number of receiving beams used by a UE is proposed. Further, a method of transmitting information about the number of receiving beams used by a UE to a base station is proposed.

Figure 8:
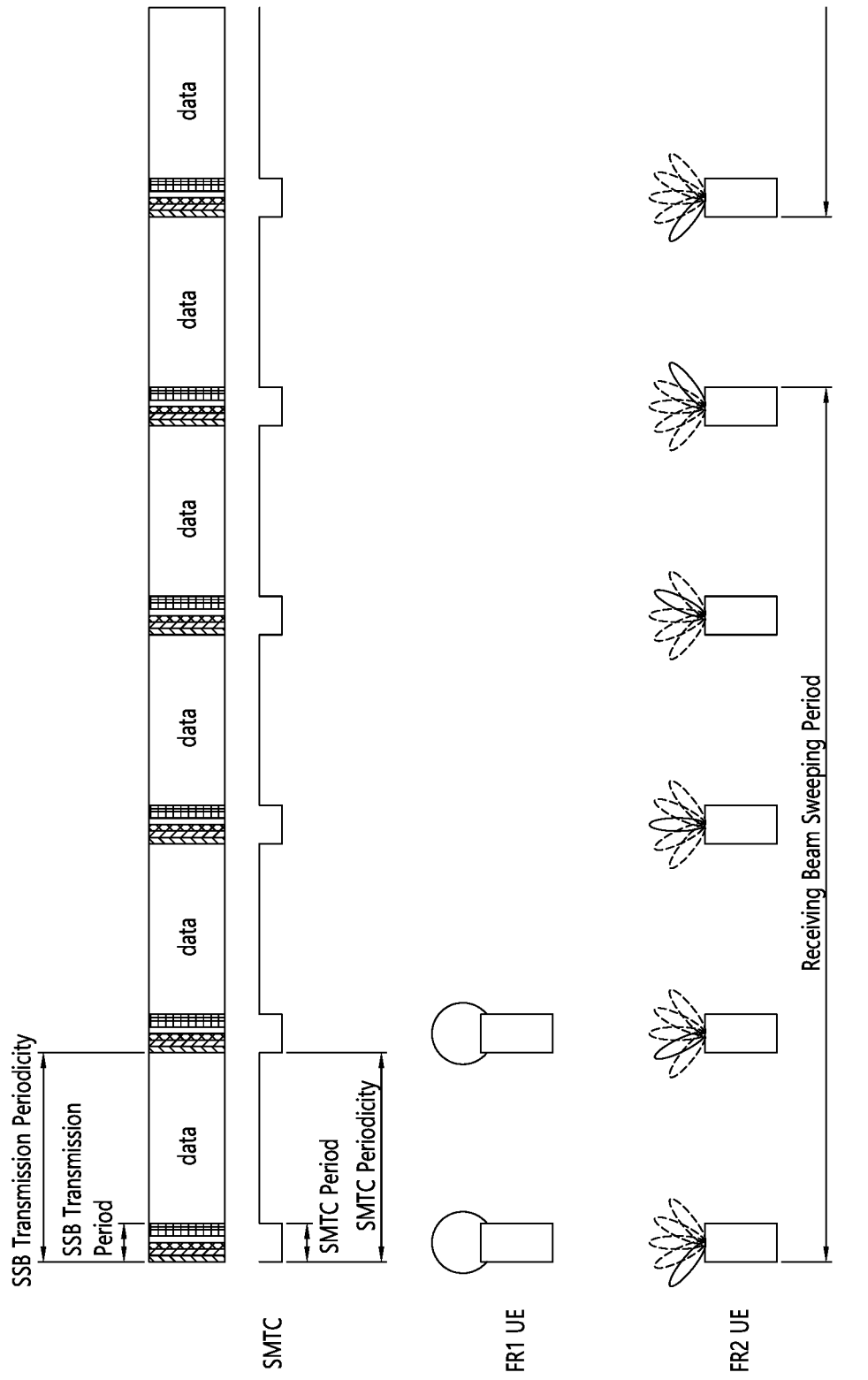
FIG. 8 illustrates an example in which a UE operating in FR1 band and a UE operating in FR2 band perform measurement.

FIG. 8 illustrates an example in which a UE operating in FR1 and a UE operating in FR2 perform measurement.

Referring to FIG. 8, a UE (FR1 UE) operating in FR1 and a UE (FR2 UE) operating in FR2 are shown. The FR1 UE and FR2 UE perform measurement of downlink signals in SMTC periods.

Here, SMTC means an SS block based RRM measurement timing configuration. In addition, an SMTC period represents a time window in which a UE expects SS block reception. A UE can receive information about the SMTC, such as the SMTC period, SMTC periodicity and an SMTC offset through higher layer signaling (e.g., RRC signaling). Then, the UE can perform measurement with respect to RRM in SMTC periods based on the information about the SMTC.

First, a measurement period of the FR1 UE will be described. An example of a measurement period for SS block (SSB) based measurement of the UE for intra-frequency measurement without a measurement gap in FR1 is as shown in the following table 17.

TABLE 17

| DRX (Discontinuous Reception) cycle | $T_{SSB\_measurement\_period}$ |
|---|---|
| When DRX is not configured or DRX cycle < SMTC period | max(200 ms, 5*SMTC period) |
| ... | ... |

For reference, when different SMTC periods are set for different cells in Table 17, the aforementioned SMTC period is an SMTC period used by a cell identified by the UE. Here, the DRX cycle refers to a cycle at which a UE for which DRX is set performs DRX operation. The DRX cycle includes ON time in which the UE performs monitoring of downlink signals and OFF time in which the UE does not perform monitoring of downlink signals.

In addition, $T_{SSB\_measurement\_period}$ means an SSB based measurement period. The SSB based measurement period may be a measurement period required when the UE performs SSB based measurement. For example, the UE can perform intra-frequency RSRP in the SSB based measurement period. In addition, max(x, y) is a max function that represents a maximum value between x and y.

The FR1 UE using an omnidirectional beam can perform measurement with respect to SSB in intra frequency measurement in $T_{SSB\_measurement\_period}$ according to Table 17. For example, when DRX is not set for the FR1 UE and the SMTC period is 50 ms, the 1-R1 UE can perform measurement with respect to SSB for 250 ms.

Since Table 17 shows the measurement period based on an omnidirectional antenna used by the FR1 UE, all transmitting beams transmitted from a base station can be measured in a single SMTC period (SMTC window period).

Meanwhile, since the FR2 UE supports a plurality of receiving beams to perform a beam sweeping operation, directions of receiving beams change and thus the FR2 UE cannot measure all transmitting beams from a base station in a single SMTC period. Accordingly, a measurement result with respect to each transmitting beam transmitted from a serving cell varies according to a beam direction of the FR2 UE.

For example, since the FR2 UE in FIG. 8 supports 5 receiving beams, a measurement result of the FR2 UE with respect to each transmitting beam transmitted from the base station may vary according to directions of the 5 receiving beams.

In other words, since SSBs in a single SMTC period are measured in the direction of a single specific receiving beam, it is necessary to increase the measurement period in response to the number of receiving beams of the UE when the UE supports a plurality of receiving beams. That is, it is necessary to increase the measurement period by reflecting a receiving beam sweeping period of the FR2 UE therein.

For example, a measurement period for SSB based measurement of a UE having 5 receiving beams in intra-frequency measurement without a measurement gap in FR2 may be defined as shown in the following table 18.

TABLE 18

| DRX cycle | $T_{SSB\_measurement\_period}$ |
|---|---|
| When DRX is not configured or DRX cycle < SMTC period | max(200 ms, 5*SMTC period)*5(number of receiving beams) |
| . . . | . . . |

For reference, when different SMTC periods are set for different cells in Table 18, the aforementioned SMTC period is an SMTC period used by a cell identified by the UE. The FR2 UE supporting 5 receiving beams can perform measurement with respect to SSB in intra-frequency measurement in $T_{SSB\_measurement\_period}$ according to Table 18. For example, when DRX is not set for the FR2 UE and the SMTC period is 50 ms, the FR2 UE can perform SSB based measurement for 1250 ms.

As described in the background, the number of receiving beams supported by a UE and a beamforming operation of the UE may vary according to implementation. That is, since various numbers of receiving beams may be supported by a UE, it is not necessary to define measurement requirements with respect to RRM for each of available numbers of receiving beams in consideration of all the available numbers of receiving beams.

Accordingly, definition of a beam class based on the number of receiving beams is proposed in the disclosure of the present specification. In addition, definition of measurement requirements based on a beam class is proposed in the disclosure of the present specification.

Furthermore, transmission of UE capability information including information about a beam class from a UE to a base station is proposed in the disclosure of the present specification.

In the disclosure of the present specification, two or more beam classes may be defined. For example, there may be three beam classes. Here, the three beam classes may correspond to "low", "medium" and "high" based on the number of receiving beams. Although description of the disclosure of the present specification will focus on a case in which there are three beam classes below, this is merely an example and the scope of the present specification also includes cases in which the number of beam classes is two, four or more.

In general, measurement accuracy increases due to a beamforming gain as the number of receiving beams increases. That is, the number of samples necessary for accuracy measurement in FR2 may be less than that in the case of FR1 because measurement accuracy increases as the number of receiving beams increases.

The three beam classes may be defined as beam class A, beam class B and beam class C. Here, beam class A is a beam class corresponding to a smallest number of receiving beams and beam class B and beam class C may be beam classes sequentially corresponding to larger numbers of receiving beams.

Beam class A, beam class B and beam class C can be defined as shown in the following table 19.

TABLE 19

| Beam class | Number of receiving beams |
|---|---|
| Class A | 1~4 |
| Class B | 5~8 |
| Class C | 9 or more |

Table 19 is merely an example and different numbers of receiving beams may be defined for each of beam classes in the disclosure of the present specification. A UE can determine a beam class thereof from among a plurality of beam classes based on the number of receiving beams supported by the UE itself. For example, when the number of receiving beams supported by the UE is 6, the UE may determine beam class B as a beam class by the UE itself.

A measurement time varies according to the number of receiving beams used by a UE. A base station needs to ascertain that the measurement time of the UE may vary, and thus the UE may report information about the beam class thereof to the base station.

Specifically, the UE may transmit UE capability information including the information about the beam class thereof to the base station.

For example, the UE may define a radio access capability parameter as follows.

ue-BeamClass-N-r1x: this field indicates the number of receiving beams supported by the UE. Further, this field may indicate that the UE supports a plurality of receiving beams for measurement requirements with respect to RRM of TS 38.133 in FR2 (mmWave).

Specifically, the UE can transmit an information element (UE-NR-Capability-v1xy0-IEs) indicating the UE capability information, as shown in the following table 20, to the base station.

TABLE 20

```
UE-NR-Capability-v1xy0-IEs ::=        SEQUENCE {
ue-BeamClass-N-r1s   ENUMERATED {classA, classB,
classC}        OPTIONAL
}
```

The information element of Table 20 is merely an example and the scope of the present specification includes any type of information element that a UE can transmit information about a beam class of the UE to the base station. As described in the background, a UE may use different numbers of receiving beams for measurement and downlink data reception because the number of receiving beams used by the UE may vary according to implementation. A case in which a UE uses different numbers of receiving beams for measurement and downlink data reception will be described with reference to FIG. 9.

Figure 9:
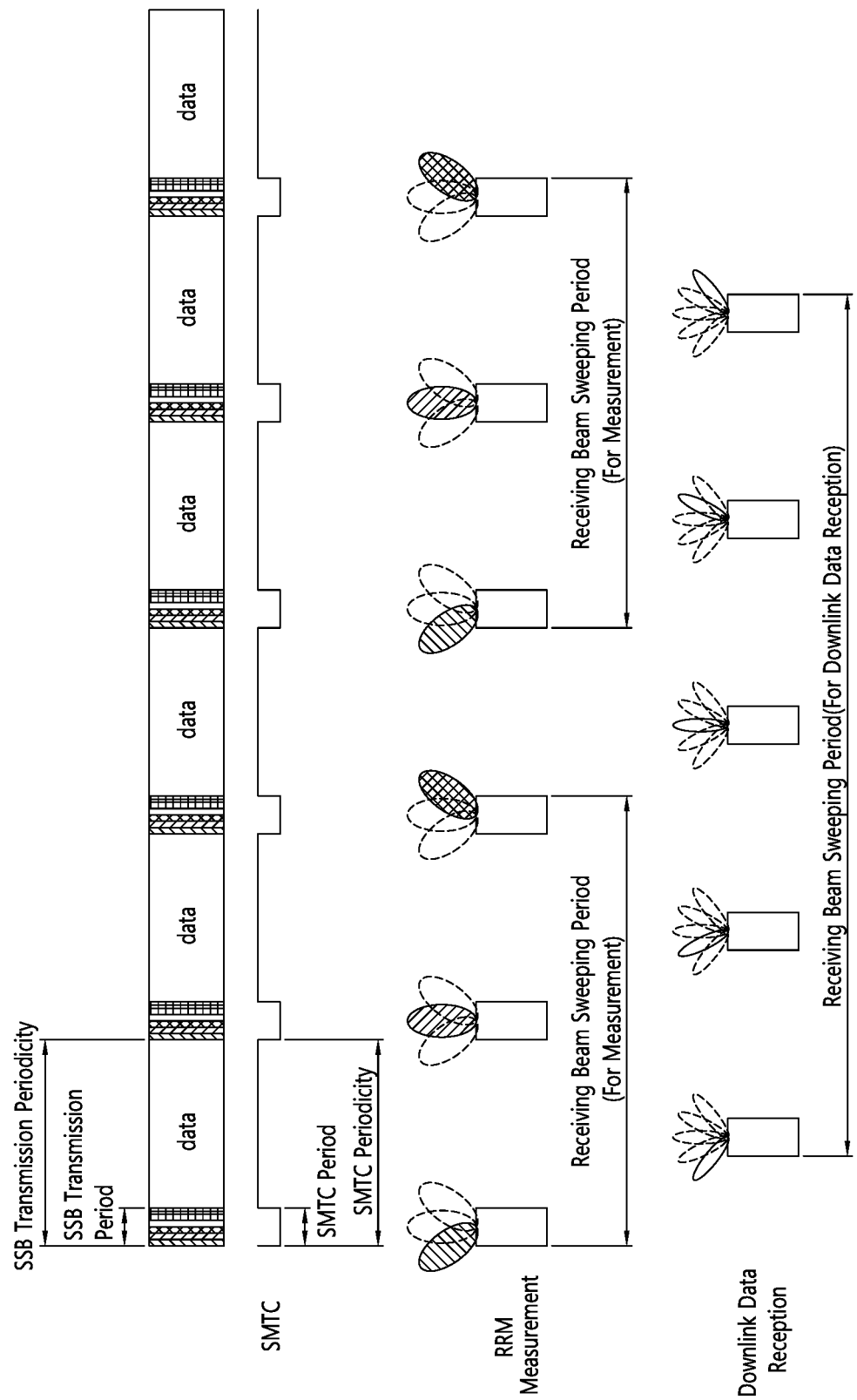
FIG. 9 illustrates an example in which a UE uses different numbers of receiving beams for measurement and downlink data reception.

FIG. 9 Illustrates an Example in which a UE Uses Different Numbers of Receiving Beams for Measurement and Downlink Data Reception.

Referring to FIG. 9, a UE operating in FR2 band may use different numbers of receiving beams when the UE performs measurement with respect to RRM and when the UE receives downlink data. For example, the UE can increase a beamforming gain using a larger number of beams when the UE receives downlink data and the UE can rapidly measure RSRP/RSRQ/SINR of a neighbor cell using a less number of beams when the UE performs measurement.

As shown in FIG. 9, the number of receiving beams used when the UE performs measurement may be 3 and the number of beams used when the UE receives downlink data may be 5.

When the UE uses different numbers of beams for measurement and downlink data reception, the UE can determine a first beam class from among a plurality of beam classes based on the number of receiving beams used for measurement. In addition, the UE can determine a second beam class from among the plurality of beam classes based on the number of receiving beams used for downlink data reception.

Here, the first beam class may be a beam class corresponding to the number of receiving beams used by the UE for measurement and the second beam class may be a beam class corresponding to the number of receiving beams used by the UE for downlink data reception. In the case of the example shown in FIG. 9, the first beam class may be beam class A and the second beam class may be beam class B.

Furthermore, the UE can transmit UE capability information including information about the first beam class and information about the second beam class to a base station. Here, a parameter representing the information about the first beam class may be the aforementioned ue-BeamClass-N-r15. In addition, a parameter representing the information about the second beam class may be defined as, for example, ue-AddBeamClass-N-r1x.

ue-AddBeamClass-N-r1x: this field indicates a beam class of receiving beams additionally used when a UE uses different numbers of receiving beams according to operation of receiving beams.

In addition, the UE may include information representing that different numbers of beams may be used for measurement and downlink data reception in the UE capability information and transmit the UE capability information to the base station. A parameter indicating the information representing that different numbers of beams may be used for measurement and downlink data reception may be defined as, for example, Ue-DataRRM-DiffRxBeam.

Ue-DataRRM-DiffRxBeam: this field indicates whether the UE can use different numbers of beams for measurement and downlink data reception.

When the UE uses different numbers of beams for measurement and downlink data reception, the UE may transmit an information element (UE-NR-Capability-v1xy0-IEs) indicating the UE capability information, as shown in the following table 21, to the base station.

TABLE 21

| UE-NR-Capability-v1xy0-IEs ::= | SEQUENCE{ |
|---|---|
| Ue-DataRRM-DiffRxBeam | ENUMERATED {supported} OPTIONAL |
| ue-BeamClass-N-r1x OPTIONAL | ENUMERATED {classA, classB, classC} |
| ue-AddBeamClass-N-r1x OPTIONAL | ENUMERATED {classA, classB, classC} |
| } | |

The UE may transmit the information element of Table 21 from which Ue-DataRRM-DiffRxBeam has been omitted. The information element of Table 21 is merely an example and the scope of the present specification includes any type of information element that the UE can transmit the information about the first beam class and the information about the second beam class to the base station. Further, the scope of the present specification includes any type of information element through which information representing that the UE can use different numbers of beams for measurement and downlink data reception to the base station.

Hereinafter, examples of defining measurement requirements with respect to RRM based on beam classes will be described with reference to Tables 22 to 28. Examples of a plurality of measurement requirements with respect to three beam classes, that is, core requirements with respect to RRM, are shown in Tables 22 to 28.

For reference, values X, Y and Z in Tables 22 to 28 may be differently defined according to beam classes. The values X, Y and Z may be determined in consideration of the fact that beam class A corresponds to a smallest number of receiving beams and beam class C corresponds to a largest number of receiving beams.

Hereinafter, 1) Tables 22 and 23 show examples of a measurement period for SSB based measurement defined based on three beam classes, 2) Tables 25 and 26 show examples of a time period for PSS/SSS detection defined based on three beam classes, and 3) Tables 27 and 28 show examples of a radio link monitoring (RLM) evaluation period defined based on three beam classes.

Table 22 shows a first example of a measurement period for SSB based measurement of a UE defined based on three beam classes in intra-frequency measurement in FR2.

TABLE 22

| DRX cycle | $T_{SSB\_measurement\_period}$ |
|---|---|
| When DRX is not configured or DRX cycle < SMTC period | max(200 ms, [X] * SMTC period) * Y |
| . . . | . . . |

For reference, when different SMTC periods are set for different cells in Table 22, the aforementioned SMTC period is an SMTC period used by a cell identified by a UE. In Table 22, X may mean the number of SSB samples necessary for a UE corresponding to each beam class to perform SSB based measurement. Y may mean the number of receiving beams representative of each beam class.

Here, (X, Y) can be set to $(n_1, m_1)$, $(n_2, m_2)$ and $(n_3, m_3)$ for beam class A, beam class B and beam class C. The values may satisfy $n_1 > n_2 > n_3$ and $m_1 < m_2 < m_3$.

Since measurement accuracy increases as the number of receiving beams increases, a UE can perform measurement with a relatively small number of samples. Accordingly, X of beam class A may be set to a largest value and X of beam class C may be set to a smallest value. In addition, since Y means the number of receiving beams representative of each beam class, Y of beam class A can be set to a smallest value and Y of beam class C can be set to a largest value.

For example, (X, Y) of beam class A can be set to $(n_1=6, m_1=4)$, (X, Y) of beam class B can be set to $(n_2=5, m_2=8)$, and (X, Y) of beam class C can be set to $(n_3=4, m_3=12)$.

When the number of receiving beams of a UE is 2 and the SMTC period is 20 ms, the beam class of the UE is beam class A and $T_{SSB\_measurement\_period}$=max(200 ms, 6*20 ms)*4, and thus $T_{SSB\_measurement\_period}$ may be 200 ms*4=800 ms. Then, the UE may perform SSB based measurement in intra-frequency measurement for 800 ms.

Table 23 shows a second example of a measurement period for SSB based measurement defined based on three beam classes in intra-frequency measurement in 1-R2 band.

TABLE 23

| DRX cycle | $T_{SSB\_measurement\_period}$ |
|---|---|
| When DRX is not configured | max[400 ms, ceil($X*K_p*K_{RLM}$)*SMTC period*Y*$CSSF_{intra}$] |
| DRX cycle ≤ 320 ms | max[400 ms, ceil($1.5*X*K_p*K_{RLM}$)* max(SMTC period, DRX cycle)*Y* $CSSF_{intra}$] |
| DRX cycle > 320 ms | ceil($X*K_p*K_{RLM}$)*DRX cycle*Y* $CSSF_{intra}$ |

For reference, when different SMTC periods are set for different cells in Table 23, the aforementioned SMTC period is an SMTC period used by a cell identified by a UE. $K_p$ is as follows.

When SMTC used for intra-frequency measurement does not overlap with measurement gaps, $K_p=1$ When SMTC used for intra-frequency measurement partially overlaps with measurement gaps, $K_p=1/(1-(SMTC\ period/MGRP))$. Here, SMTC period<MGRP.

$K_{RLM}$ is as follows.

When RLM-RS outside a measurement gap in FR2 band completely overlaps with SMTC used for intra-frequency measurement, $K_{RLM}=1.5$ In other cases, $K_{RLM}=1$ $CSSF_{intra}$ is a carrier specific scaling factor. $CSSF_{intra}$ may be used to increase a measurement period when a UE monitors multiple measurement objects. For example, $CCSF_{intra}$ when there is no measurement gap can be defined as shown in the following table 24.

TABLE 24

| | $CSSF_{intra}$ for FR1 PSCell | $CSSF_{intra}$ for FR1 SCells | $CSSF_{intra}$ for FR2 PScell/ frequency where SCC neighbours are measured | $CSSF_{intra}$ for FR2 SCells where neighbour cell measurement on the SCC is not required |
|---|---|---|---|---|
| EN-DC with FR1 only CA | 1 | Number of configured FR1 SCells | N/A | N/A |
| EN-DC with FR2 only intra band CA | N/A | N/A | 1 | Number of configured FR2 SCells |

In Table 24, E-UTRAN New Radio-Dual Connectivity (EN-DC) refers to dual connectivity between E-UTRAN and New Radio. SCC refers to a secondary component carrier.

RLM-RS refers to a reference signal for RLM. For example, RLM-RS may be composed of a CSI-RS and/or an SSB. In addition, ceil may be a rounding function of rounding up a value in a parenthesis.

In Table 23, (X, Y) can be set based on a beam class as in the method of Table 22. That is, (X, Y) may be set to $(n_1, m_1)$, $(n_2, m_2)$ and $(n_3, m_3)$ for beam class A, beam class B and beam class C. The values can satisfy $n_1 > n_2 > n_3$ and $m_1 < m_2 <$ ms.

For example, (X, Y) of beam class A can be set to $(n_1=6, m_1=4)$, (X, Y) of beam class B can be set to $(n_2=5, m_2=8)$, and (X, Y) of beam class C can be set to $(n_3=4, m_3=12)$.

When the number of receiving beams of a UE is 2, a DRX cycle is 30 ms, an SMTC period is 20 ms, Kp=1, $K_{RLM}=1.5$, and $CSSF_{intra}=1$, the beam class of the UE is beam class A and thus (X, Y)=(6, 4). According to Table 23, $T_{SSB\_measurement\_period}$=max[400 ms, ceil(1.5*6* 1*1.5)*max(20 ms, 30 ms)*4*1]. That is, $T_{SSB\_measurement\_period}$=max[400 ms, 1,680 ms]=1,680 ms. In this case, the UE can perform SSB based measurement in intra-frequency measurement for 1,680 ms.

Table 25 shows a first example of a time period for PSS/SSS detection defined based on three beam classes in intra-frequency measurement in FR2.

TABLE 25

| DRX cycle | $T_{PSS/SSS\_sync\_intra}$ (FR2) |
|---|---|
| When DRX is not configured or DRX cycle < SMTC period | max(600 ms, [X]*SMTC period)*Y |
| ... | ... |

For reference, when different SMTC periods are set for different cells in Table 25, the aforementioned SMTC period is an SMTC period used by a cell identified by a UE. In Table 25, X may mean the number of PSS/SSS samples necessary for a UE corresponding to each beam class to detect a PSS/SSS. Y may mean the number of receiving beams representative of each beam class. In addition, $T_{PSS/SSS\_sync\_intra}$ is a time period used in PSS/SSS detection. That is, $T_{PSS/SSS\_sync\_intra}$ may be a time required to detect a PSS/SSS.

In Table 25, (X, Y) may be set based on a beam class as in the method of Table 22. That is, (X, Y) may be set to $(n_1, m_1)$, $(n_2, m_2)$ and $(n_3, m_3)$ for beam class A, beam class B and beam class C. The values may satisfy $n_1 > n_2 > n_3$ and $m_1 < m_2 < m_3$.

For example, (X, Y) of beam class A can be set to ($n_1$=6, $m_1$=4), (X, Y) of beam class B can be set to ($n_2$=5, $m_2$=8), and (X, Y) of beam class C can be set to ($n_3$=4, $m_3$=12).

When the number of receiving beams of a UE is 2 and an SMTC period is 20 ms, the beam class of the UE is beam class A and $T_{PSS/SSS\_sync\_intra}$ may be 600 ms*4=2,400 ms. Then, the UE can perform PSS/SSS detection for 2,400 ms.

Table 26 shows a second example of a time period for PSS/SSS detection defined based on three beam classes in intra-frequency measurement in FR2 band.

Table 26 shows a second example of a time period for PSS/SSS detection defined based on three beam classes in intra-frequency measurement in FR2 band.

TABLE 26

| DRX cycle | $T_{PSS/SSS\_sync\_intra}$ |
|---|---|
| DRX is not configured | max[600 ms, ceil(X*$K_p$*$K_{RLM}$)*SMTC period*Y*$CSSF_{intra}$] |
| DRX cycle ≤ 320 ms | max[600 ms, ceil(1.5*X*$K_p$*$K_{RLM}$)* max(SMTC period, DRX cycle)*Y* $CSSF_{intra}$] |
| DRX cycle > 320 ms | ceil(X*$K_p$*$K_{RLM}$)*DRX cycle*Y* $CSSF_{intra}$ |
| ... | ... |

For reference, when different SMTC periods are set for different cells in Table 26, the aforementioned SMTC period is an SMTC period used by a cell identified by a UE. $K_p$, $K_{RLM}$ and $CSSF_{intra}$ can be set as described with reference to Table 23.

In Table 26, (X, Y) can be set based on a beam class as in the method of Table 22. That is, (X, Y) may be set to ($n_1$, $m_1$), ($n_2$, $m_2$) and ($n_3$, $m_3$) for beam class A, beam class B and beam class C. The values may satisfy $n_1$>$n_2$>$n_3$ and $m_1$<$m_2$<$m_3$.

For example, (X, Y) of beam class A can be set to ($n_{1=6}$, $m_1$=4), (X, Y) of beam class B can be set to ($n_2$=5, $m_2$=8), and (X, Y) of beam class C can be set to ($n_3$=4, $m_3$=12).

When the number of receiving beams of a UE is 2, a DRX cycle is 30 ms, an SMTC period is 20 ms, $K_p$=1, $K_{RLM}$=1.5, and $CSSF_{intra}$=1, the beam class of the UE is beam class A and thus (X, Y)=(6, 4). According to Table 26, $T_{PSS/SSS\_sync\_intra}$=max[600 ms, ceil(1.5*6*1*1.5)*max(20 ms, 30 ms)*4*1]. That is, $T_{SSB\_measurement\_period}$=max[600 ms, 1,680 ms]=1,680 ms. In this case, the UE can perform PSS/SSS detection in intra-frequency measurement for 1,680 ms.

Table 27 shows a first example of an RLM evaluation period defined based on three beam classes in intra-frequency measurement in FR2 band.

TABLE 27

| DRX configuration | $T_{Evaluate\_out}$ (ms) | $T_{Evaluate\_in}$ (ms) |
|---|---|---|
| When DRX is not configured | [X]*max(20 ms, $T_{SSB}$)*Y | [Z]*max(20 ms, $T_{SSB}$)*Y |
| When DRX is configured | [X]*max(20 ms, $T_{DRX}$, $T_{SSB}$)*Y | [Z]*max(20 ms, $T_{DRX}$, $T_{SSB}$)*Y |

$T_{SSB}$ may be an period of SSB set for RLM. $T_{DRX}$ can be a duration of a DRX cycle. A UE can receive information about $T_{SSB}$ and $T_{DRX}$ through higher layer signaling. $T_{Evaluate\_in}$ and $T_{Evaluate\_out}$ may be evaluation periods used for a UE to evaluate the quality of downlink radio link.

Specifically, the UE may determine whether the quantity of downlink radio link of RLM-RS resources estimated for $T_{Evaluate\_in}$ is higher than a threshold value $Q_{in\_SSB}$. In addition, the UE may determine whether the quantity of downlink radio link of RLM-RS resources estimated for $T_{Evaluate\_out}$ is less than a threshold value $Q_{out\_SSB}$.

$Q_{in\_SSB}$ is a threshold value used for SSB based RLM and can be defined as a level at which a downlink radio link can be received with reliability. $Q_{out\_SSB}$ is a threshold value used for SSB based RLM and can be defined as a level at which a downlink radio link cannot be received with reliability. A UE may receive $Q_{in\_SSB}$ and $Q_{out\_SSB}$ through higher layer signaling.

X and Z can represent numbers of SSB samples necessary for a UE corresponding to each beam class to evaluate the quality of radio link by comparing it with $Q_{in\_SSB}$ and $Q_{out\_SSB}$. Y can represent the number of receiving beams representative of each beam class.

In Table 27, (X, Y) can be set based on a beam class as in the method of Table 22. That is, (X, Y) may be set to ($n_1$, $m_1$), ($n_2$, $m_2$) and ($n_3$, $m_3$) for beam class A, beam class B and beam class C. The values may satisfy $n_1$>$n_2$>$n_3$ and $m_1$<$m_2$<$m_3$.

In Table 27, Z can be set to $l_1$, $l_2$ and $l_3$ for beam class A, beam class B and beam class C. The values may satisfy $l_1$>$l_2$>$l_3$.

For example, (X, Y, Z) of beam class A can be set to ($n_1$=6, $m_1$=4, $l_1$=5), (X, Y, Z) of beam class B can be set to ($n_2$=5, $m_2$=8, $l_2$=4), and (X, Y, Z) of beam class C can be set to ($n_3$=4, $m_3$=12, $l_3$=3).

When the number of receiving beams of a UE is 2, DRX is configured, $T_{DRX}$=25 ms, and $T_{SSB}$=20 ms, the beam class of the UE is beam class A and thus (X, Y, Z) may be (6, 4, 5). Then, $T_{Evaluate\_in}$ is 6*max(20 ms, 25 ms, 20 ms)*4 and thus is 600 ms. In addition, $T_{Evaluate\_out}$ is 5*max(20 ms, 25 ms, 20 ms)*4 and thus is 500 ms.

In this case, the UE may evaluate whether the quality of downlink radio link of RLM-RS resources estimated for 600 ms is higher than the threshold value $Q_{in\_SSB}$. In addition, the UE may evaluate whether the quality of downlink radio link of RLM-RS resources estimated for 500 ms is less than the threshold value $Q_{out\_SSB}$.

Table 28 shows a second example of an RLM evaluation period defined based on three beam classes in intra-frequency measurement in FR2.

TABLE 28

| DRX configuration | $T_{Evaluate\_out}$ (ms) | $T_{Evaluate\_in}$ (ms) |
|---|---|---|
| When DRS is not configured | max(200, ceil(X*P*Y)*T) | max(100, ceil(Z*P*Y)*$T_{SSB}$) |
| DRX cycle ≤ 320 ms | max(200, ceil(X*P*Y)*max($T_{DRX}$, $T_{SSB}$)) | max(100, ceil(Z*P*Y)*max($T_{DRX}$, $T_{SSB}$)) |
| DRX cycle > 320 ms | ceil(X*P*Y)*$T_{DRX}$ | ceil(Z*P*Y)*$T_{DRX}$ |

P is as follows.

When an RLM-RS and a measurement gap do not overlap, i) if the RLM-RS and SMTC ($T_{SSB}$<$T_{SMTCperiod}$) partially overlap, P=1/(1−$T_{SSB}$/$T_{SMTCperiod}$).

ii) if the RLM-RS and SMTC ($T_{SSB}$=$T_{SMTCperiod}$) completely overlap, P=3.

When the RLM-RS and the measurement gap partially overlap, i) if the RLM-RS and SMTC ($T_{SSB}<T_{SMTCperiod}$) partially overlap and the SMTC and the measurement gap do not overlap, $P=1/(1-T_{SSB}/MGRP-T_{SSB}/T_{SMTCperiod})$.

ii) If the RLM-RS and SMTC ($T_{SSB}<T_{SMTCperiod}$) partially overlap and the SMTC and the measurement gap partially overlap or completely overlap, $P=1/\{(1-T_{SSB}/\min(T_{SMTCperiod}, MGRP))\}$.

iii) If the RLM-RS and SMTC ($T_{SSB}=T_{SMTCperiod}$) completely overlap and the SMTC and the measurement gap ($T_{SMTCperiod}<MGRP$) partially overlap, $P=1/(1-T_{SSB}/MGRP)*3$.

Here, $T_{SMTCperiod}$ is the duration of the SMTC period.

In Table 28, X, Y and Z can be defined as in Table 27. That is, X and Z can represent numbers of SSB samples necessary for a UE corresponding to each beam class to evaluate the quality of radio link by comparing it with $Q_{in\_SSB}$ and $Q_{out\_SSB}$. Y can represent the number of receiving beams representative of each beam class.

In Table 28, (X, Y) can be set based on a beam class as in the method of Table 22. That is, (X, Y) may be set to (($n_1$, $m_1$), ($n_2$, $m_2$) and ($n_3$, $m_3$) for beam class A, beam class B and beam class C. The values may satisfy $n_1>n_2>n_3$ and $m_1<m_2<m_3$.

In Table 28, Z can be set to $l_1$, $l_2$ and $l_3$ for beam class A, beam class B and beam class C. The values may satisfy $l_1>l2>l3$.

For example, (X, Y, Z) of beam class A can be set to ($n_1$=6, $m_1$=4, $l_1$=5), (X, Y, Z) of beam class B can be set to ($n_2$=5, $m_2$=8, $l_2$=4), and (X, Y, Z) of beam class C can be set to ($n_3$=4, $m_3$=12, $l_3$=3).

When an RLM-RS and a measurement gap do not overlap, the RLM-RS and SMTC completely overlap, the number of receiving beams of a UE is 2, DRX is configured, $T_{DRX}$=25 ms, and $T_{SSB}$=20 ms, the beam class of the UE is beam class A and thus (X, Y, Z) is (6, 4, 5) and P=3. Then, $T_{Evaluate\_in}$ is max(200 ms, 1,800 ms) and thus is 1,800 ms. In addition, $T_{Evaluate\_out}$ is max(100 ms, 1500 ms) and thus is 1,500 ms.

In this case, the UE may evaluate whether the quality of downlink radio link of RLM-RS resources estimated for 1,800 ms is higher than the threshold value $Q_{in\_SSB}$. In addition, the UE can evaluate whether the quality of downlink radio link of RLM-RS resources estimated for 1,500 ms is less than the threshold value $Q_{out\_SSB}$.

In Tables 22 to 28, methods in which a measurement period for SSB based measurement, a time period for PSS/SSS detection, and a radio link monitoring evaluation period have different values according to a plurality of beam classes are proposed.

Although only three measurement requirements (a measurement period for SSB based measurement, a time period for PSS/SSS detection, and a radio link monitoring evaluation period) are disclosed in description of Tables 22 to 28, these are merely an example and the scope of the present specification is not limited thereto.

The method for defining measurement requirements with respect to RRM based on a beam class proposed in the present specification includes all cases in which measurement requirements (for example, a measurement gap, DRX configuration, SCell detection, inter-frequency cell detection, inter-frequency measurement, cell selection, handover, etc.), which are not disclosed with reference to Tables 22 to 28, are defined such that they have different values based on beam classes.

Figure 10:
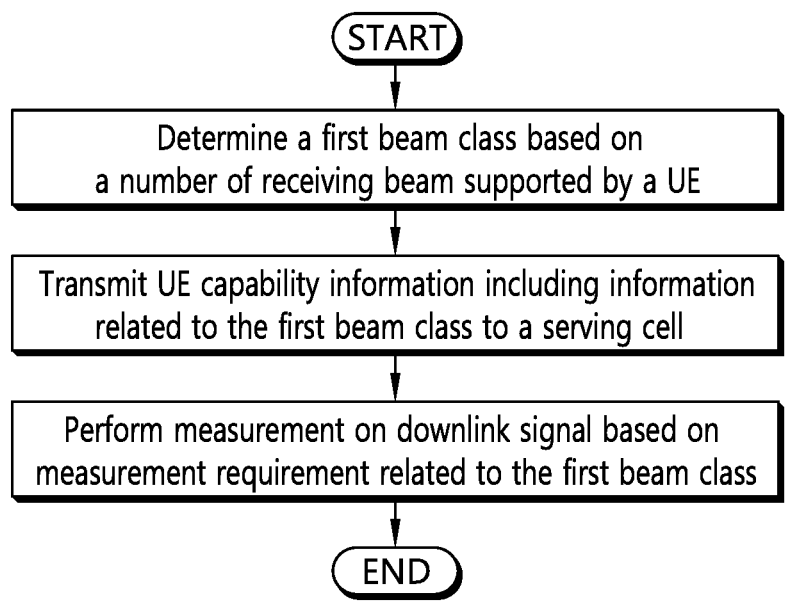
FIG. 10 is a flowchart showing a UE operation according to the disclosure of the present specification.

FIG. 10 is a Flowchart Showing a UE Operation According to the Disclosure of the Present Specification.

Referring to FIG. 10, a UE may determine a first beam class based on the number of receiving beams supported by the UE. A plurality of beam classes may be three, two or less, or four or more beam classes, as described with reference to Table 19.

The UE may transmit UE capability information including information about the first beam class to a serving cell. For example, the UE may transmit the information element (UE-NR-Capability-v1xy0-IEs) representing the UE capability information as shown in Tables 20 and 21 to a base station.

Then, the UE may perform measurement on a downlink signal based on measurement requirements related to the first beam class.

Specifically, the UE may select measurement requirements from a plurality of measurement requirements related to each beam class. Then, the UE may perform measurement on a downlink signal based on the selected measurement requirements related to the first beam class.

Here, a plurality of measurement requirements related to each of the plurality of beam classes may include at least one of a measurement period for SSB based measurement related to each beam class, a time period for PSS/SSS detection related to each beam class, and a radio link monitoring evaluation period related to each beam class, as described with reference to Tables 22 to 28. The measurement period, the time period and the evaluation period may have different values according to the plurality of beam classes as described with reference to Tables 22 to 28.

Then, the UE may receive downlink data based on the number of receiving beams supported by the UE.

The UE operation illustrated in FIG. 10 may be basically performed by the UE according to the disclosure of the present specification. Hereinafter, 1) UE operation in consideration of use of different numbers of receiving beams for measurement and downlink data reception (first example), 2) UE operation in consideration of UE mobility change (second example), and 3) UE operation conceived as a power saving mode operation (third example) will be described with reference to FIGS. 11 to 13.

Redundant description in the first to third examples of FIGS. 11 to 13 and FIG. 10 is omitted and description focuses on differences.

A UE may perform only one of the UE operation shown in FIG. 10 and operations disclosed in the first to third examples or may perform a combination of one or more of the UE operation shown in FIG. 10 and operations disclosed in the first to third examples.

1. First Example

Figure 11:
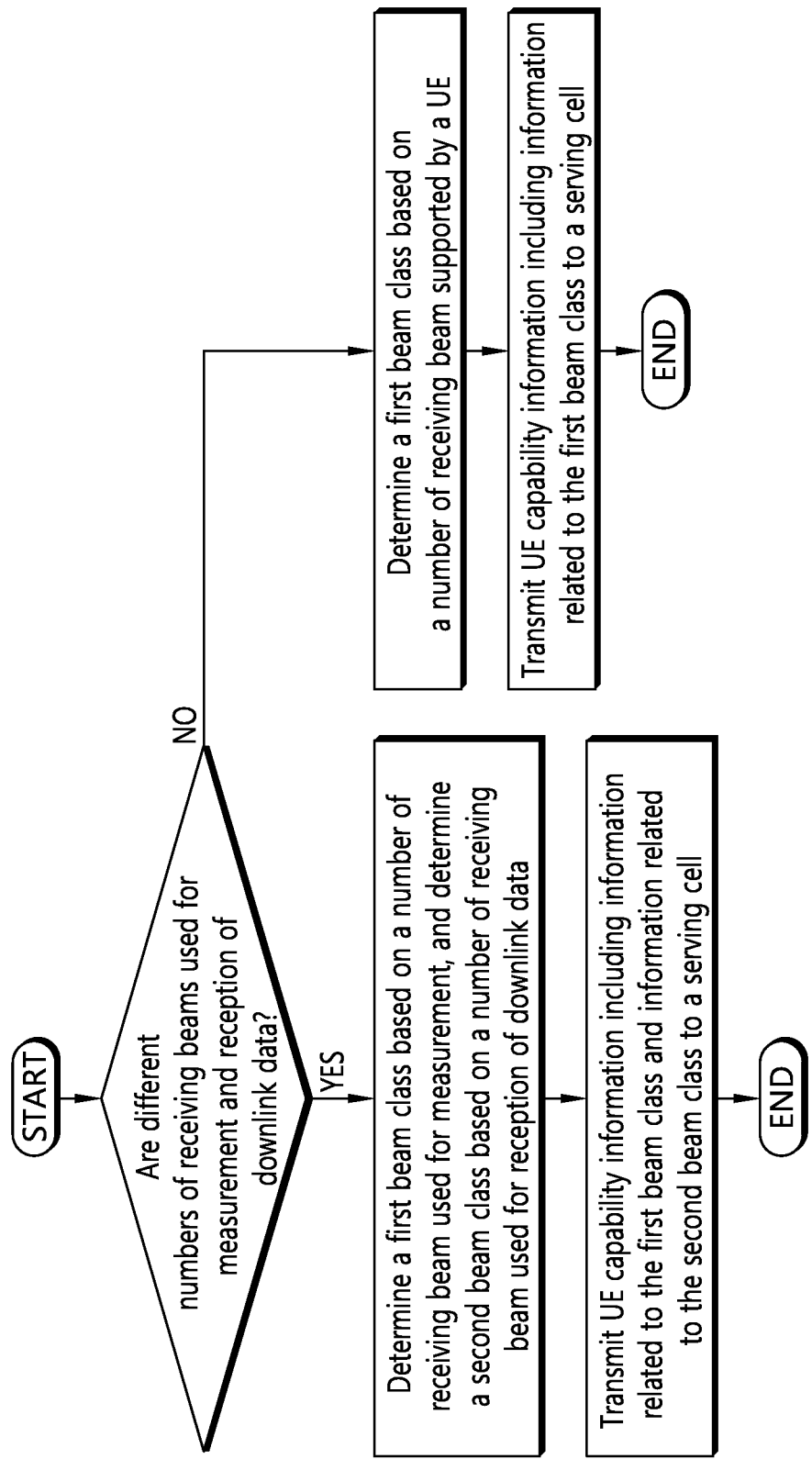
FIG. 11 is a flowchart showing a UE operation according to a first example of the disclosure of the present specification.

FIG. 11 is a Flowchart Showing a UE Operation According to the First Example of the Disclosure of the Present Specification.

A UE may determine whether different numbers of receiving beams are used for measurement and downlink data reception.

When different numbers of receiving beams are not used for measurement and downlink data reception, the UE may determine the first beam class based on the number of receiving beams supported by the UE and may transmit UE capability information including the information about the first beam class to a serving cell as in the operation shown in FIG. 10. In addition, the UE may perform measurement on a downlink signal based on measurement requirements related to the first beam class. Further, the UE may receive downlink data based on the number of receiving beams supported by the UE.

When different numbers of receiving beams are used for measurement and downlink data reception, the UE may determine the first beam class from among a plurality of beam classes based on the number of receiving beams used for measurement. In addition, the UE may determine a second beam class based on the number of receiving beams used for downlink data reception.

Then, the UE may transmit UE capability information including the information about the first beam class and information about the second beam class to the serving cell. Further, the UE may include information representing that different numbers of receiving beams can be used for measurement and downlink data reception in the UE capability information and may transmit the UE capability information to the base station. For example, the UE may transmit the information element representing the UE capability information, as shown in Table 21, to the base station.

The UE may perform measurement on a downlink signal based on measurement requirements related to the first beam class. Then, the UE may receive downlink data based on the number of receiving beams used for downlink data reception.

2. Second Example

Figure 12:
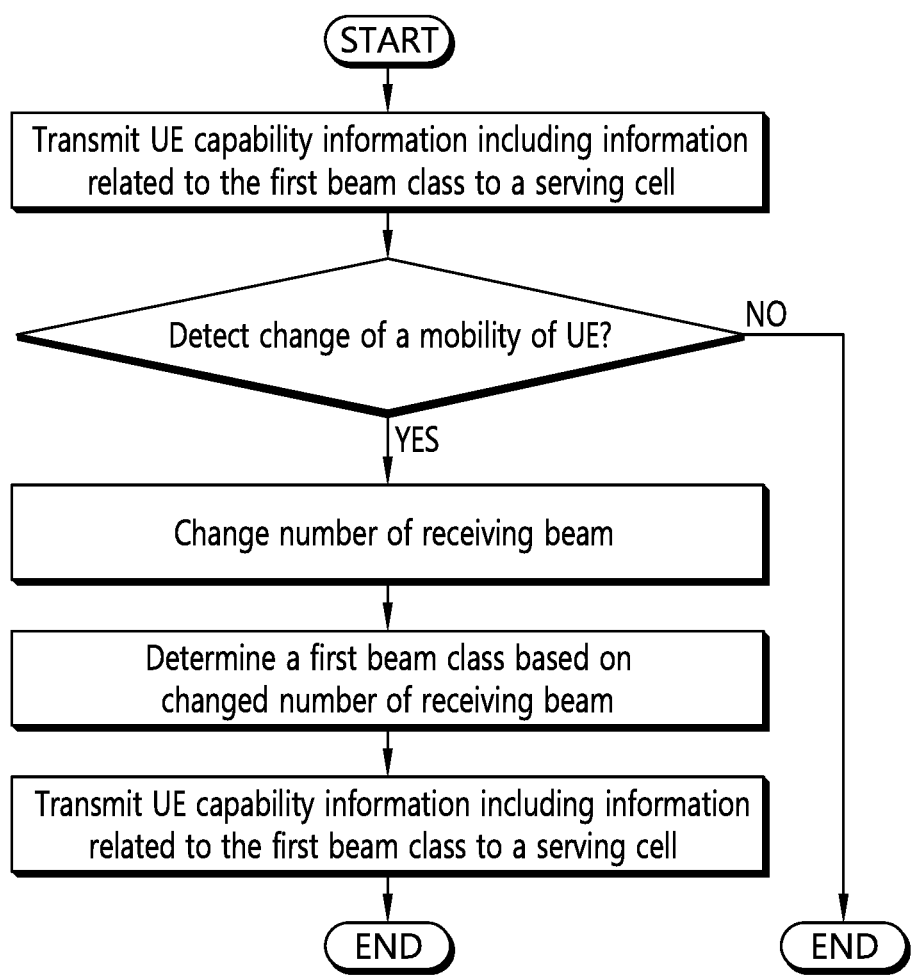
FIG. 12 is a flowchart showing a UE operation according to a second example of the disclosure of the present specification.

FIG. 12 is a Flowchart Showing a UE Operation According to the Second Example of the Disclosure of the Present Specification.

A UE may change the number of receiving beams used thereby in consideration of change in mobility. Here, the UE includes various types of terminals, such as a smartphone, a fixed wireless access type terminal, and a vehicle mounted type terminal.

For example, when the UE operates in an environment in which the UE is moving at a high speed and then operates in an environment in which the UE stops, the UE may reduce the number of receiving beams used thereby and perform measurement and downlink data reception. On the contrary, when the UE operates in an environment in which the UE stops and then operates in an environment in which the UE is moving at a high speed, the UE may increase the number of receiving beams used thereby and perform measurement and downlink data reception.

Change in mobility considered by the UE may be change in a speed as described above and may include various changes such as changes in places such as indoor/outdoor places. When, the UE changes the number of receiving beams, the UE needs to additionally report UE capability information including information about a beam class to the serving cell.

Specifically, referring to FIG. 12, after the UE transmit the UE capability information including the information about the first beam class to the serving cell, the UE may determine whether change in UE mobility is detected.

When change in UE mobility is not detected, the UE may not change the number of receiving beams and may not additionally report the UE capability information to the serving cell. In addition, the UE may perform measurement on a downlink signal based on the measurement requirements related to the first beam class as described in FIG. 10.

When change in UE mobility is detected, the UE may change the number of receiving beams. Specifically, the UE may increase or decrease the number of receiving beams according to detected mobility change.

The UE may determine a first beam class from among the plurality of beam classes based on the changed number of receiving beams. Then, the UE may transmit the UE capability information including information about the first beam class to the serving cell. Then, the UE may perform measurement on a downlink signal based on measurement requirements related to the first beam class. Here, when the first beam class determined based on the changed number of receiving beams is the same as the first beam class determined based on the number of receiving beams before changed, the UE may not transmit the UE capability information to the serving cell.

Meanwhile, even when different numbers of receiving beams are used for measurement and downlink data reception, the UE may perform the operation according to the second example.

Specifically, when different numbers of receiving beams are used for measurement and downlink data reception, the UE may change the number of receiving beams as follows. For example, the UE may improve measurement quality with respect to a neighbor cell using a larger number or receiving beams and use a relatively small number of beams for downlink data reception in an indoor environment having low mobility or in an environment in which the UE is moving at a low speed because a neighbor cell environment does not significantly change. Further, the UE may perform rapid measurement on a neighbor cell using a small number of receiving cells and use a relatively large number of beams for data reception in an outdoor environment having high mobility or in an environment in which the UE is moving at a high speed.

A UE operation according to the second example when different numbers of receiving beams are used for measurement and downlink data reception will be described in detail below.

When change in UE mobility is detected, the UE may change the number of receiving beams used for measurement and the number of receiving beams used for downlink data reception. Then, the UE may determine a first beam class and a second beam class based on the changed number of receiving beams used for measurement and the changed number of receiving beams used for downlink data reception. Then, the UE may transmit UE capability information including information about the first beam class and information about the second beam class to the serving cell.

3. Third Example

Figure 13:
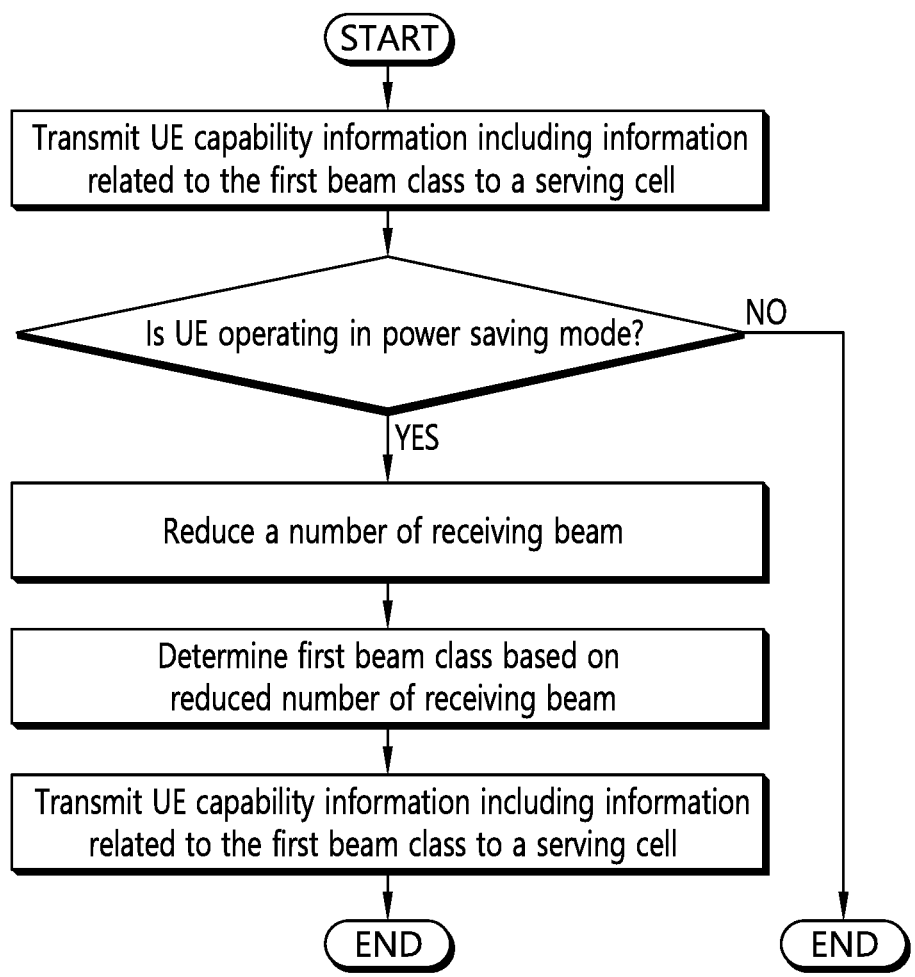
FIG. 13 is a flowchart showing a UE operation according to a third example of the disclosure of the present specification.

FIG. 13 is a Flowchart Showing a UE Operation According to the Third Example of the Disclosure of the Present Specification.

Power consumption of a UE increases as the number of receiving beams used by the UE increases. This is because UE operations for beam management for data reception or neighbor cell measurement for mobility increases for each receiving beam as the number of receiving beams increases to increase power consumption.

Accordingly, when the UE operates in a power saving mode in order to reduce UE power consumption, the UE may reduce the number of receiving beams used thereby.

For example, the UE can operate in the power saving mode when a remaining battery capacity is equal to or less than a threshold capacity or input for instructing the UE to operate in the power saving mode is received from a user.

Referring to FIG. 13, after the UE transmits the UE capability information including the information about the first beam class to the serving cell, the UE may determine whether the UE operates in the power saving mode. For example, the UE may determine whether a remaining battery capacity is equal to or less than the threshold capacity or input for instructing the UE to operate in the power saving mode is received from a user, as described above.

When the UE does not operate in the power saving mode, the UE may determine the first beam class based on the number of receiving beams supported by the UE and transmit the UE capability information including the information about the first beam class as in the operation of FIG. 10. Then, the UE may perform measurement on a downlink signal based on the measurement requirements related to the first beam class. Further, the UE may receive downlink data based on the number of receiving beams supported by the UE.

When the UE operates in the power saving mode, the UE may reduce the number of receiving beams used thereby. Then, the UE may determine a first beam class based on the reduced number of receiving beams. The UE may transmit UE capability information including information about the first beam class to the serving cell. Then, the UE may perform measurement on a downlink signal based on measurement requirements related to the first beam class. Further, the UE may receive downlink data based on the reduced number of receiving beams.

Meanwhile, the UE may perform the operation according to the third example even when different number of receiving beams are used for measurement and downlink data reception of the first example.

Specifically, when different number of receiving beams are used for measurement and downlink data reception, the UE may transmit UE capability information including information about the first beam class and information about the second beam class to the serving cell. Then, the UE may reduce the numbers of receiving beams used for measurement and downlink data reception when the UE operates in the power saving mode. The UE may determine the first beam class and the second beam class based on the reduced numbers of receiving beams and transmit information about the first beam class and information about the second beam class to the serving cell.

Figure 14:
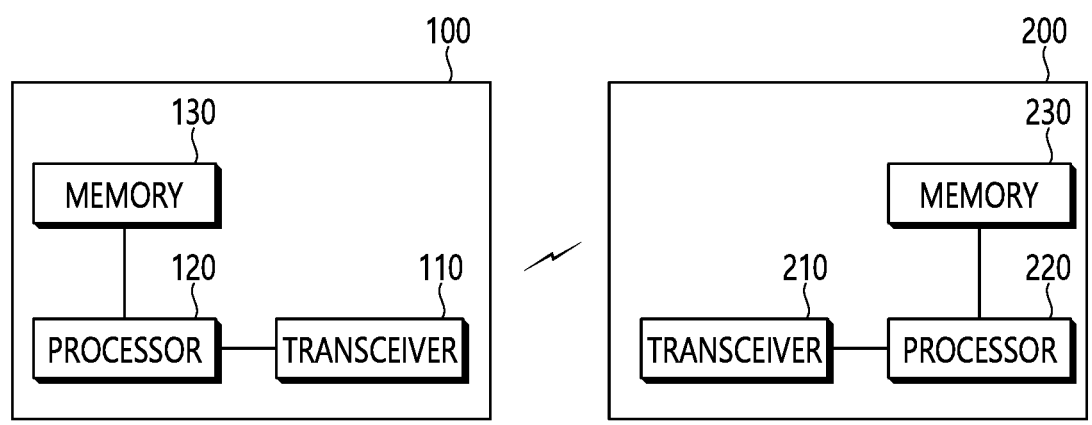
FIG. 14 is a block diagram illustrating a wireless device and a base station, by which a disclosure of this specification is implemented.

FIG. 14 is a Block Diagram Illustrating a Wireless Device and a Base Station, by which the Disclosure of this Specification can be Implemented.

Referring to FIG. 14, a wireless device 100 and a base station 200 may implement the disclosure of this specification.

The wireless device 100 includes a processor 101, a memory 102, and a transceiver 103. Likewise, the base station 200 includes a processor 201, a memory 202, and a transceiver 203. The processors 101 and 201, the memories 102 and 202, and the transceivers 103 and 203 may be implemented as separate chips, or at least two or more blocks/functions may be implemented through one chip.

Each of the transceivers 103 and 203 includes a transmitter and a receiver. When a particular operation is performed, either or both of the transmitter and the receiver may operate. Each of the transceivers 103 and 203 may include one or more antennas for transmitting and/or receiving a radio signal. In addition, each of the transceivers 103 and 203 may include an amplifier configured for amplifying a Rx signal and/or a Tx signal, and a band pass filter for transmitting a signal to a particular frequency band.

Each of the processors 101 and 201 may implement functions, procedures, and/or methods proposed in this specification. Each of the processors 101 and 201 may include an encoder and a decoder. For example, each of the processors 101 and 202 may perform operations described above. Each of the processors 101 and 201 may include an application-specific integrated circuit (ASIC), a different chipset, a logic circuit, a data processing device, and/or a converter which converts a base band signal and a radio signal into each other.

Each of the memories 102 and 202 may include a Read-Only Memory (ROM), a Random Access Memory (RAM), a flash memory, a memory card, a storage medium, and/or any other storage device.

Figure 15:
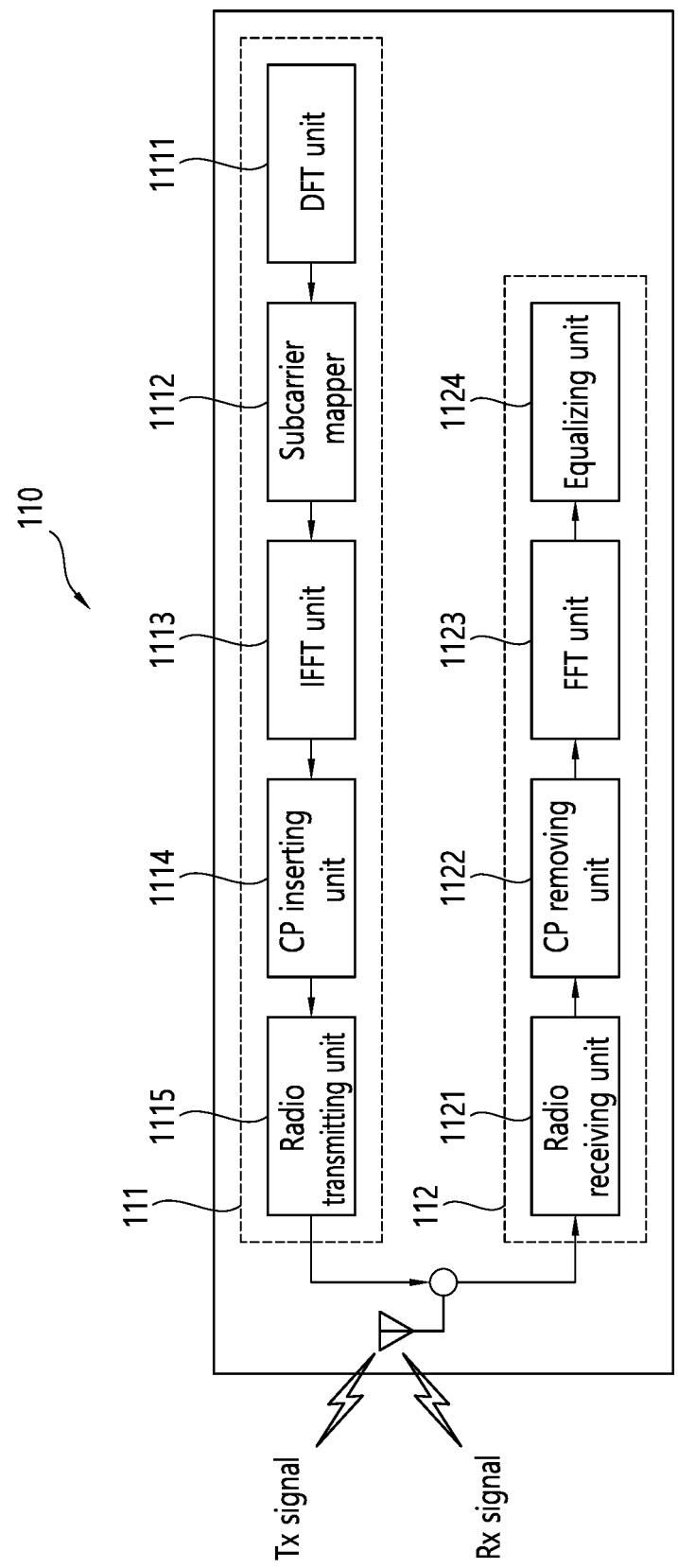
FIG. 15 is a detailed block diagram of a transceiver of the wireless device shown in FIG. 14.

FIG. 15 is a detailed block diagram illustrating a transceiver of the wireless device shown in FIG. 14.

Referring to FIG. 15, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFFT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

The processors may include an application-specific integrated circuit (ASIC), other chipsets, a logic circuit, and/or a data processor. The memories may include a read-only memory (ROM), a random access memory (RAM), a flash memory, a memory card, a storage medium and/or other storage devices. The RF units may include a baseband circuit for processing RF signals. When an embodiment is implemented by software, the above-described methods may be implemented as modules (e.g., processors and functions) which execute the above-described functions. The modules may be stored in the memories and executed by the processors. The memories may be positioned inside or outside the processors and connected to the processors through known means.

In the above exemplary system, although the methods have been described based on the flowcharts using a series of the steps or blocks, the disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the disclosure.

What is claimed is:

1. A method for performing measurement by a user equipment (UE), the method comprising:
receiving measurement configuration information from a serving cell;
receiving radio resource configuration information from the serving cell;
determining a first beam class from among a plurality of beam classes based on a number of receiving beams supported by the UE;
transmitting UE capability information;
performing a measurement on a downlink signal; and
transmitting a measurement report to the cell based on the measurement,
wherein the UE capability information includes information about the first beam class to the serving cell, and
wherein the measurement is performed based on a measurement requirement related to the first beam class.

2. The method of claim 1, further comprising:
receiving downlink data based on the number of receiving beams supported by the UE.

3. The method of claim 1, wherein the determining of the first beam class comprises:
determining the first beam class from among the plurality of beam classes based on a number of receiving beams used for measurement and determining a second beam class from among the plurality of beam classes based on a number of receiving beams used for downlink data reception, when different numbers of receiving beams are used for measurement and downlink data reception.

4. The method of claim 3, wherein the UE capability information includes information about the first beam class and information about the second beam class.

5. The method of claim 3, further comprising:
receiving the downlink data based on the number of receiving beams used for downlink data reception.

6. The method of claim 1, further comprising:
changing the number of receiving beams when change in mobility of the UE is detected after the UE capability information is transmitted to the serving cell.

7. The method of claim 6, further comprising:
determining the first beam class from among the plurality of beam classes based on the changed number of receiving beams; and
transmitting UE capability information including information about the first beam class determined based on the changed number of receiving beams to the serving cell.

8. The method of claim 1, further comprising:
reducing the number of receiving beams when the UE operates in a power saving mode after the UE capability information is transmitted to the serving cell.

9. The method of claim 8, further comprising:
determining the first beam class from among the plurality of beam classes based on the reduced number of receiving beams; and
transmitting UE capability information including information about the first beam class determined based on the reduced number of receiving beams to the serving cell.

10. The method of claim 1, wherein the performing the measurement further comprises:
selecting the measurement requirement related to the first beam class from a plurality of measurement requirements related to each of the plurality of beam classes.

11. The method of claim 10, wherein the plurality of measurement requirements related to each of the plurality of beam classes includes:
at least one of a measurement period for synchronization signal/physical broadcast channel block (SS/PBCH block: SSB) based measurement related to each of the plurality of beam classes, a time period for PSS/SSS detection related to each of the plurality of beam classes, and a radio link monitoring (RLM) evaluation period related to each of the plurality of beam classes.

12. The method of claim 11, wherein the measurement period, the time period and the evaluation period have different values according to the plurality of beam classes.

13. A user equipment (UE) performing measurement, comprising:
a transceiver; and
a processor configured to control the transceiver,
wherein the processor is configured to:
receive measurement configuration information from a serving cell;
receive radio resource configuration information from the serving cell;
determine a first beam class from among a plurality of beam classes based on a number of receiving beams supported by the UE;
transmit UE capability information;
perform a measurement on a downlink signal; and
transmitting a measurement report to the cell based on the measurement,
wherein the UE capability information includes information about the first beam class to the serving cell, and
wherein the measurement is performed based on a measurement requirement related to the first beam class.

14. The UE of claim 13, wherein the processor is further configured to:
select the measurement requirement related to the first beam class from a plurality of measurement requirements related to each of the plurality of beam classes,
wherein the plurality of measurement requirements related to each of the plurality of beam classes includes at least one of a measurement period for synchronization signal/physical broadcast channel block (SS/PBCH block: SSB) based measurement related to each of the plurality of beam classes, a time period for PSS/SSS detection related to each of the plurality of beam classes, and a radio link monitoring (RLM) evaluation period related to each of the plurality of beam classes.

* * * * *